(12) United States Patent
Holcomb

(10) Patent No.: US 11,007,600 B2
(45) Date of Patent: *May 18, 2021

(54) SYSTEM AND METHOD FOR ADDITIVE MANUFACTURING

(71) Applicant: Grid Logic Incorporated, Lapeer, MI (US)

(72) Inventor: Matthew J. Holcomb, Metamora, MI (US)

(73) Assignee: Grid Logic Incorporated, Lapeer, MI (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/105,736

(22) Filed: Aug. 20, 2018

(65) Prior Publication Data
US 2018/0354061 A1 Dec. 13, 2018

Related U.S. Application Data

(63) Continuation of application No. 14/300,621, filed on Jun. 10, 2014, now Pat. No. 10,259,072.
(Continued)

(51) Int. Cl.
*B23K 13/01* (2006.01)
*H05B 6/06* (2006.01)
(Continued)

(52) U.S. Cl.
CPC ............. *B23K 13/01* (2013.01); *B22F 3/105* (2013.01); *B22F 3/1017* (2013.01); *B22F 7/02* (2013.01);
(Continued)

(58) Field of Classification Search
CPC .... B23K 13/01; B23K 37/0235; B23K 37/04; B23K 37/0426; B23K 37/0461;
(Continued)

(56) References Cited

U.S. PATENT DOCUMENTS 2,622,238 A 12/1952 Boltson
2,870,418 A 1/1959 Hewitt, Jr.
(Continued)

OTHER PUBLICATIONS

International Search Report and Written Opinion dated Dec. 31, 2014, International Patent Application No. PCT/US14/58389 with International Filing Date of Sep. 30, 2014, (8 pages).
(Continued)

*Primary Examiner* — Michael P Wieczorek
(74) *Attorney, Agent, or Firm* — Stephen M. De Klerk

(57) ABSTRACT

A method for forming a component includes providing a first layer of a mixture of first and second powders. The method includes determining the frequency of an alternating magnetic field to induce eddy currents sufficient to bulk heat only one of the first and second powders. The alternating magnetic field is applied at the determined frequency to a portion of the first layer of the mixture using a flux concentrator. Exposure to the magnetic field changes the phase of at least a portion of the first powder to liquid. A change in power transferred to the powder during a phase change in the powder is calculated to determine the quality of component formation.

6 Claims, 18 Drawing Sheets

Related U.S. Application Data

(60) Provisional application No. 61/938,881, filed on Feb. 12, 2014, provisional application No. 61/898,054, filed on Oct. 31, 2013, provisional application No. 61/896,896, filed on Oct. 29, 2013, provisional application No. 61/885,806, filed on Oct. 2, 2013, provisional application No. 61/868,625, filed on Aug. 22, 2013, provisional application No. 61/833,020, filed on Jun. 10, 2013.

(51) Int. Cl.

| | |
|---|---|
| *B22F 7/06* | (2006.01) |
| *B22F 7/02* | (2006.01) |
| *B22F 10/00* | (2021.01) |
| *B22F 10/10* | (2021.01) |
| *B22F 3/10* | (2006.01) |
| *B23K 37/02* | (2006.01) |
| *B23K 37/04* | (2006.01) |
| *H05B 6/10* | (2006.01) |
| *B22F 3/105* | (2006.01) |
| *B23K 103/08* | (2006.01) |
| *B23K 103/14* | (2006.01) |
| *B23K 103/16* | (2006.01) |
| *B22F 1/00* | (2006.01) |
| *B23K 103/00* | (2006.01) |

(52) U.S. Cl.
CPC ............... *B22F 7/06* (2013.01); *B22F 10/00* (2021.01); *B23K 37/0235* (2013.01); *B23K 37/04* (2013.01); *B23K 37/0426* (2013.01); *B23K 37/0461* (2013.01); *H05B 6/06* (2013.01); *H05B 6/101* (2013.01); *B22F 1/0003* (2013.01); *B22F 10/10* (2021.01); *B22F 2003/1053* (2013.01); *B22F 2202/07* (2013.01); *B22F 2998/10* (2013.01); *B23K 2103/08* (2018.08); *B23K 2103/14* (2018.08); *B23K 2103/16* (2018.08); *B23K 2103/52* (2018.08); *Y02P 10/25* (2015.11)

(58) Field of Classification Search
CPC ...... B22F 3/1017; B22F 3/105; B22F 3/1055; H05B 6/06; H05B 6/101
See application file for complete search history.

(56) References Cited

U.S. PATENT DOCUMENTS

| | | | |
|---|---|---|---|
| 3,241,956 A | 3/1966 | Inoue | |
| 4,087,322 A | 5/1978 | Marcus | |
| 4,231,796 A | 11/1980 | Clark et al. | |
| 4,255,494 A | 3/1981 | Reen et al. | |
| 4,305,784 A | 12/1981 | Ohkawa | |
| 4,521,659 A | 6/1985 | Buckley et al. | |
| 5,076,869 A | 12/1991 | Bourell et al. | |
| 5,147,587 A | 9/1992 | Marcus et al. | |
| 5,389,408 A * | 2/1995 | DeVolk .................. | B22F 3/105 427/191 |
| 5,640,667 A | 6/1997 | Freitag et al. | |
| 5,675,306 A | 10/1997 | Diaz | |
| 5,874,713 A | 2/1999 | Cydzik | |
| 5,963,771 A | 10/1999 | Chan et al. | |
| 5,965,282 A | 10/1999 | Baermann | |
| 6,031,215 A | 2/2000 | Nanataki et al. | |
| 6,069,479 A | 5/2000 | Taicher et al. | |
| 6,078,781 A | 6/2000 | Takagi et al. | |
| 6,417,754 B1 | 7/2002 | Bernhardt et al. | |
| 6,533,995 B1 | 3/2003 | Wullenweber et al. | |
| 6,875,966 B1 | 4/2005 | Barber et al. | |
| 7,038,178 B2 | 5/2006 | Suzuki | |
| 7,723,653 B2 | 5/2010 | Clark et al. | |
| 7,767,941 B2 | 8/2010 | Kagan | |
| 7,864,013 B2 | 1/2011 | Muelleman | |
| 8,172,126 B2 * | 5/2012 | Baker ..................... | H01L 24/29 228/233.1 |
| 8,316,683 B2 | 11/2012 | Tomizawa et al. | |
| 8,334,747 B2 | 12/2012 | Matsumoto | |
| 8,382,834 B2 | 2/2013 | Prescott | |
| 8,444,800 B2 | 5/2013 | Nagaura et al. | |
| 8,606,160 B2 | 12/2013 | Nakase et al. | |
| 8,732,939 B2 | 5/2014 | Uchida | |
| 8,738,147 B2 | 5/2014 | Hasints | |
| 9,457,403 B2 | 10/2016 | Holcomb | |
| 10,259,072 B2 * | 4/2019 | Holcomb .................. | H05B 6/06 |
| 2001/0050448 A1 | 12/2001 | Kubo et al. | |
| 2002/0105114 A1 | 8/2002 | Kubo et al. | |
| 2003/0024916 A1 | 2/2003 | Wright et al. | |
| 2004/0191406 A1 | 9/2004 | Crum et al. | |
| 2006/0124631 A1 | 6/2006 | Alfredeen | |
| 2007/0022823 A1 | 2/2007 | Knill et al. | |
| 2007/0235445 A1 | 10/2007 | Wilgen et al. | |
| 2007/0241482 A1 | 10/2007 | Giller et al. | |
| 2010/0015002 A1 | 1/2010 | Barrera et al. | |
| 2011/0297658 A1 | 12/2011 | Peters et al. | |
| 2012/0329659 A1 | 12/2012 | Holcomb | |
| 2013/0189385 A1 | 7/2013 | Zoppas et al. | |
| 2013/0329659 A1 | 12/2013 | Holcomb | |
| 2014/0163717 A1 | 6/2014 | Das et al. | |
| 2014/0314964 A1 | 10/2014 | Ackelid | |
| 2014/0361464 A1 | 12/2014 | Holcomb | |
| 2015/0296571 A1 | 10/2015 | Holcomb | |
| 2015/0367448 A1 | 12/2015 | Buller et al. | |

OTHER PUBLICATIONS

International Search Report and Written Opinion dated May 25, 2017, International PCT Patent Application No. PCT/US201/016574 with International Filing Date of Feb. 3, 2017, (17 pages).
Invitation to Pay Additional Fees p PCT Article 17(3)(a) and Rules 40.1 and 40.2(e) dated Apr. 2, 2017, International PCT Patent Application No. PCT/US17/16574 with International Filing Date of Feb. 3, 2017, (3 pages).
"Materials safety data sheet for carbon nanotubes", supplied by Cheap Tubes Inc. Revision Date: Apr. 13, 2015, (9 pages).
Non Final Office Action dated Feb. 22, 2018, U.S. Appl. No. 14/459,096, (10 pages).
Non Final Office Action dated Jun. 12, 2017, U.S. Appl. No. 14/300,621, (9 pages).
"Physical properties of titanium and its alloys", Total Materia. http://www.totalmateria.com/Articles122.htm. Published May 2005. Accessed Dec. 29, 2016., (2 pages).
Non Final Office Action dated Oct. 26, 2020, U.S. Appl. No. 16/202,453, (23 pages).
Agarwal, D. , "Microwave sintering of ceramics, composites and metal powders. Sintering of advanced materials", Woodhead Publishing. 2010. (Year: 2010), pp. 222-248.
Popovic, Zoya et al., ""The Skin Effect", Introductory Electromagnetics", Chapter 20, Prentice-Hall. (Year: 1999), pp. 382-392.

* cited by examiner

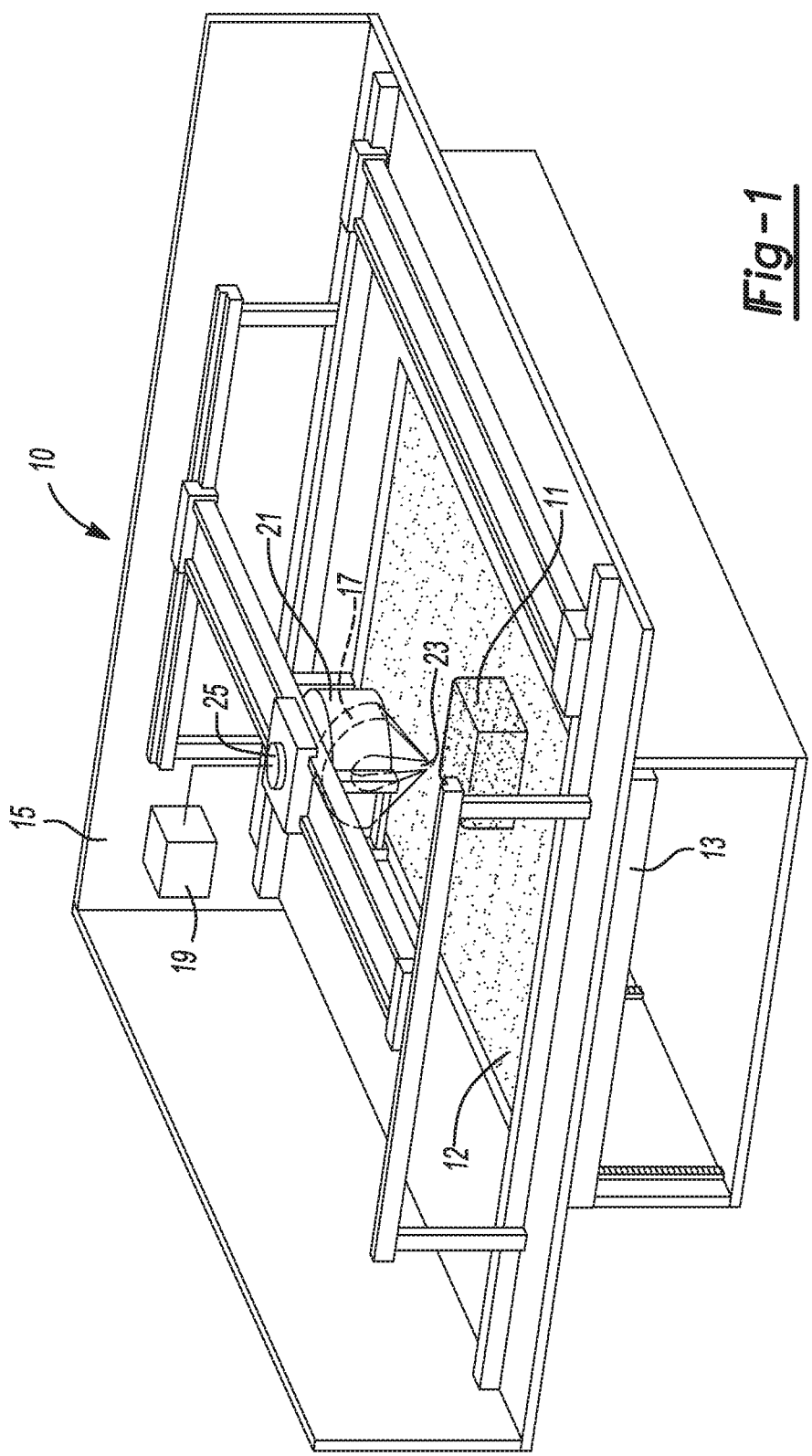

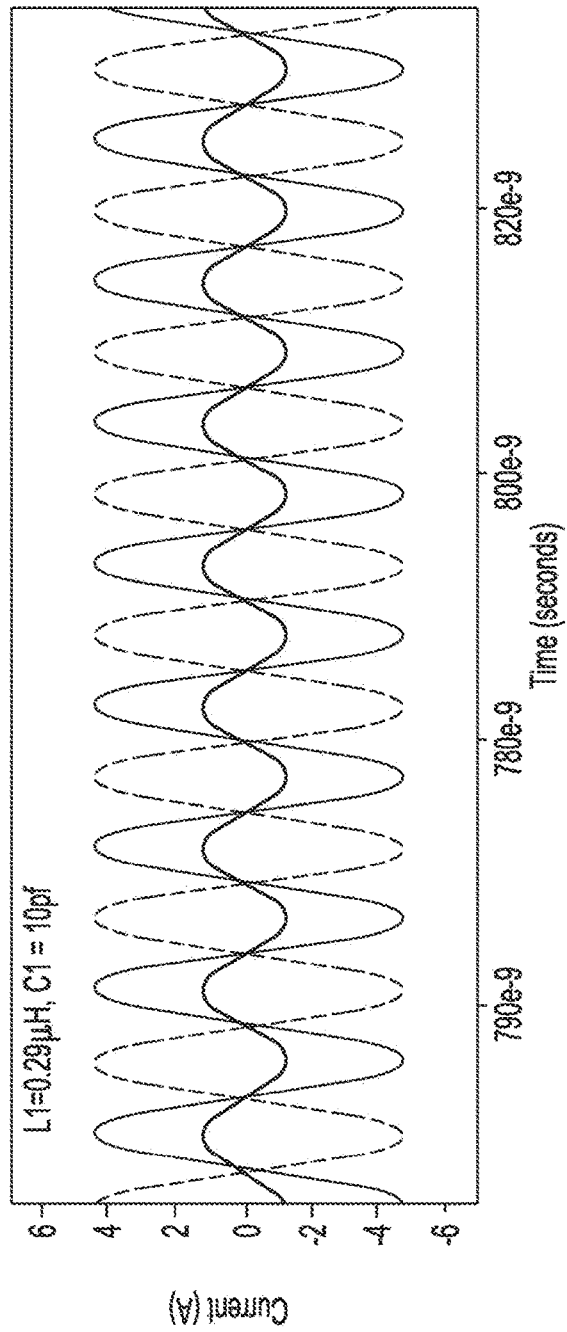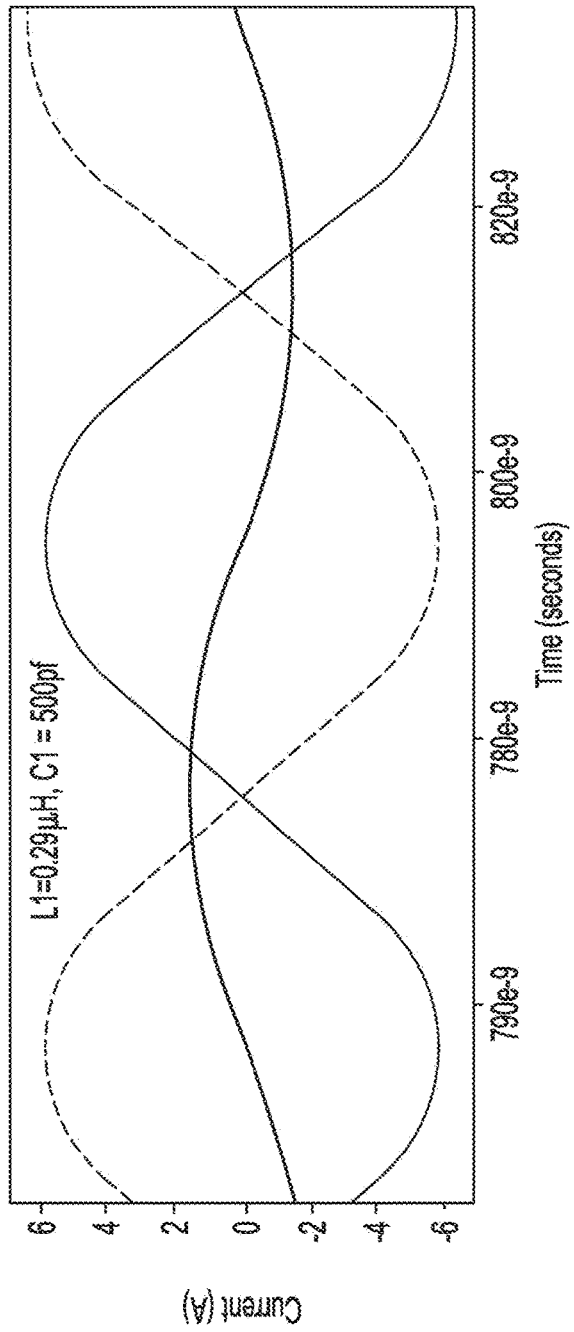

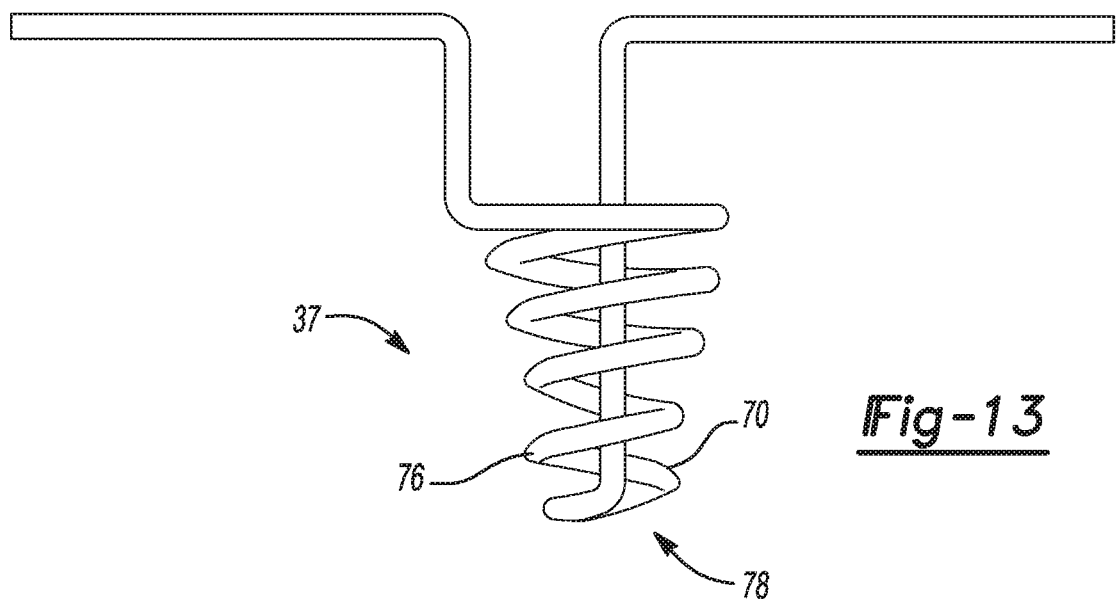

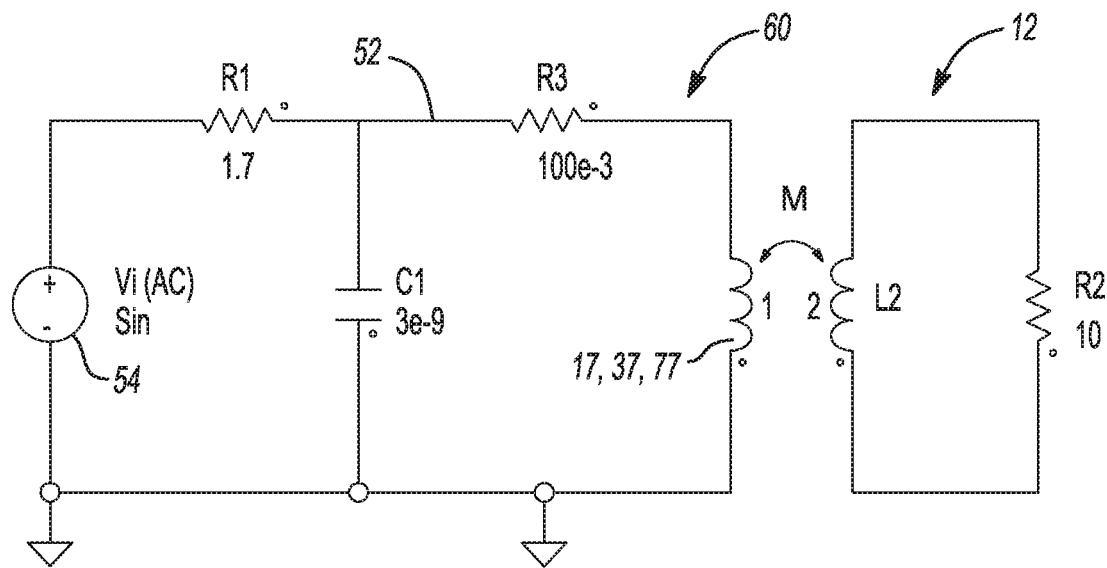
Fig-15
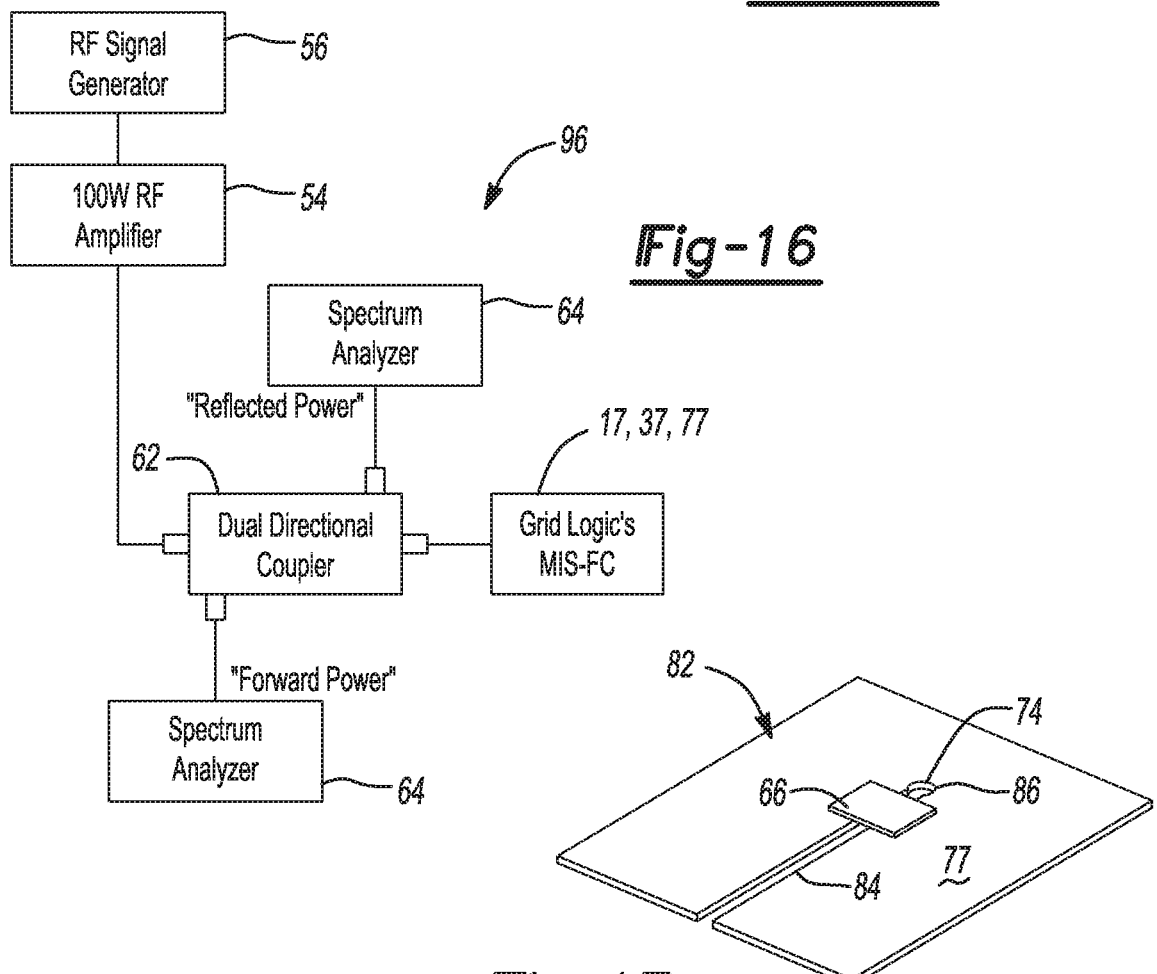
Fig-16
Fig-17

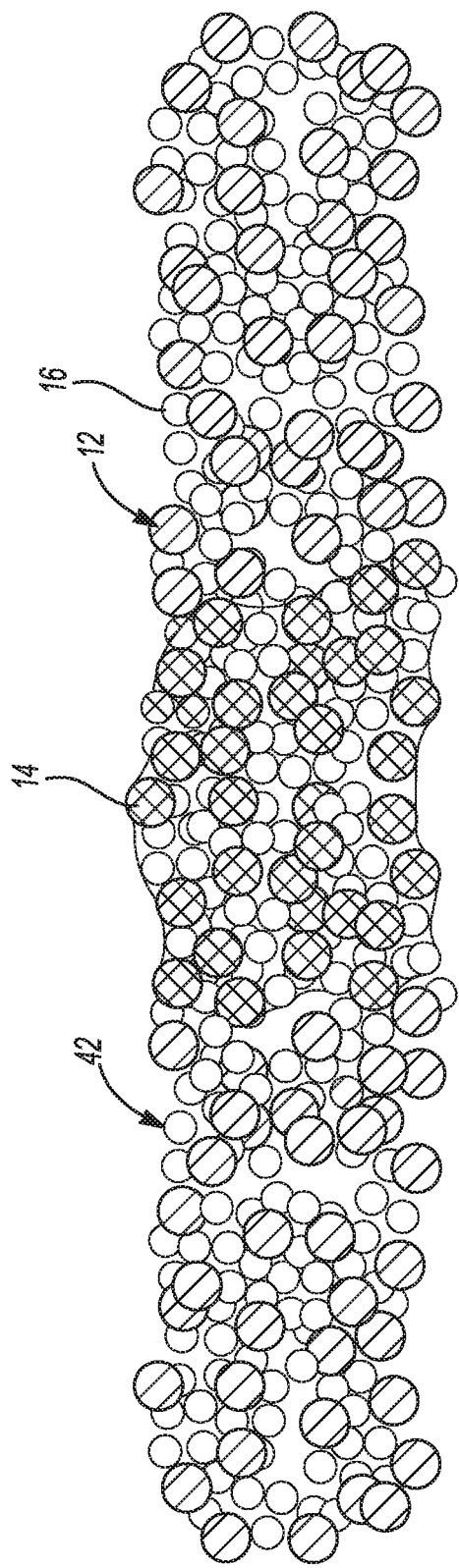
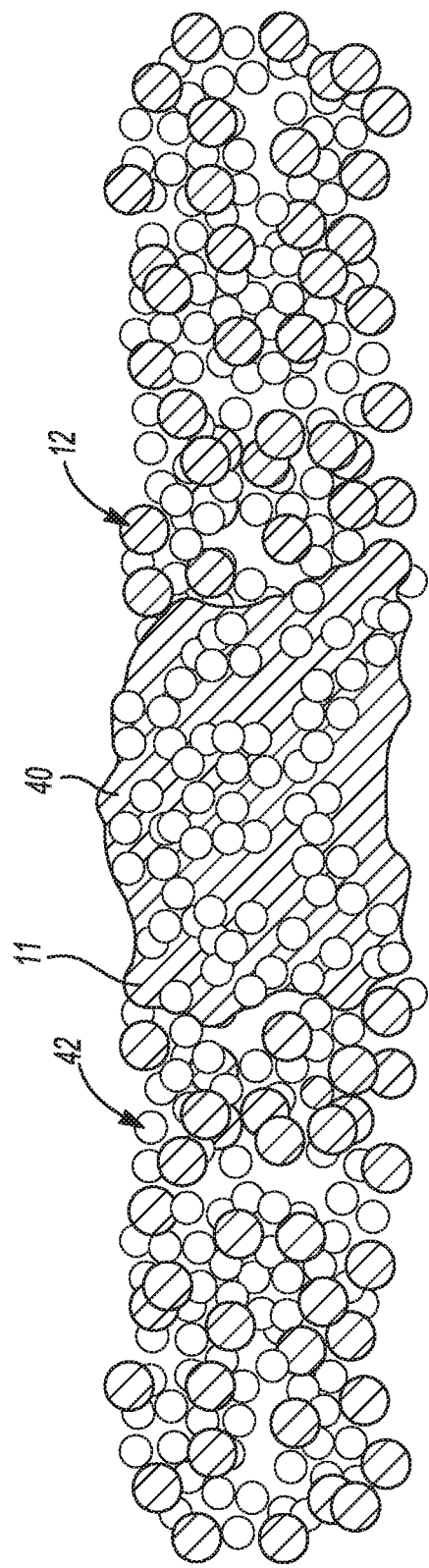

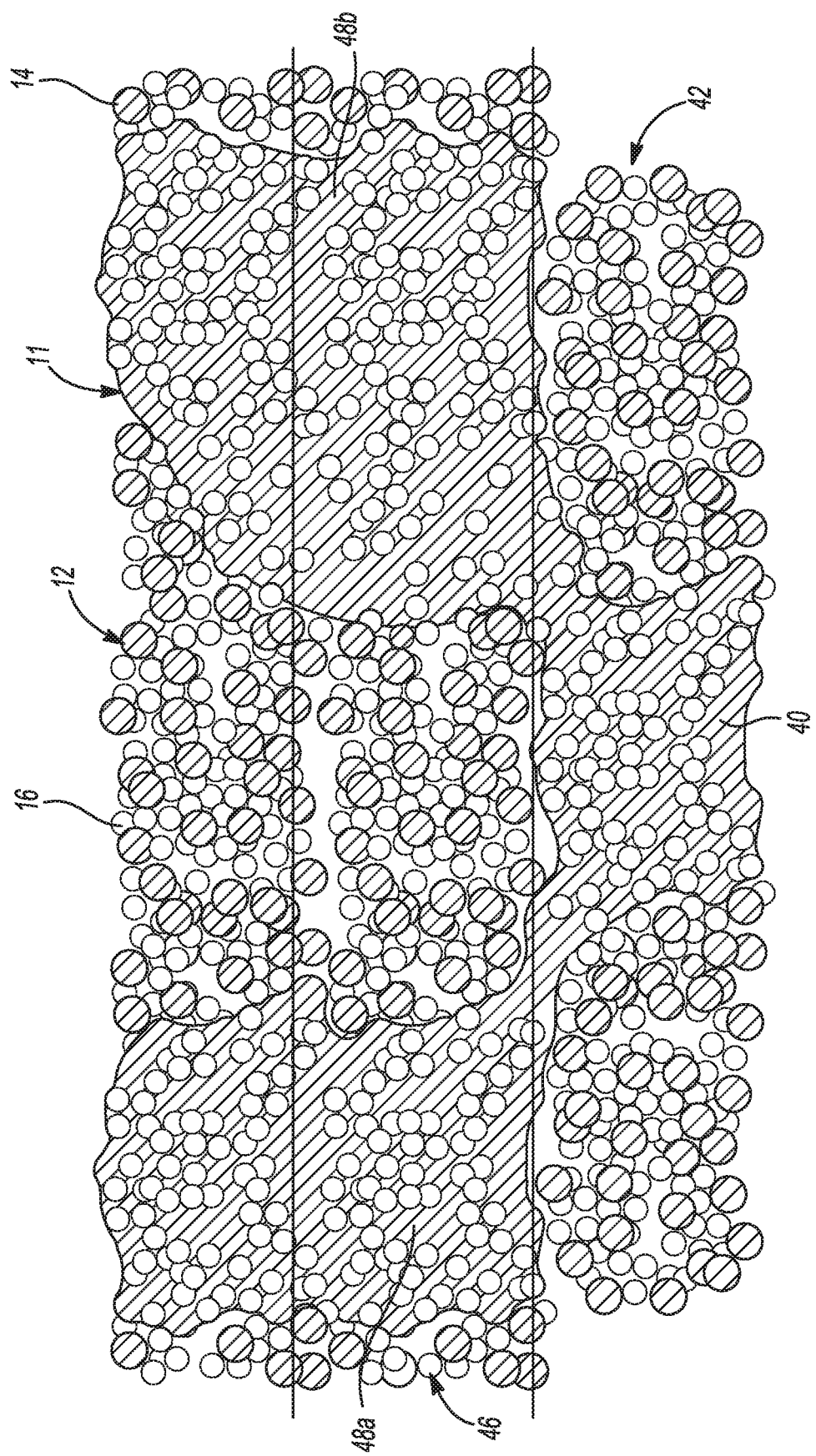

SYSTEM AND METHOD FOR ADDITIVE MANUFACTURING

CROSS-REFERENCE TO RELATED APPLICATIONS

This application is a continuation application of U.S. patent application Ser. No. 14/300,621, filed on Jun. 10, 2014 which claims the benefit of U.S. Application No. 61/833,020 filed on Jun. 10, 2013, U.S. Provisional Application No. 61/868,625 filed on Aug. 22, 2013, U.S. Provisional Application No. 61/885,806 filed on Oct. 2, 2013, U.S. Provisional Application No. 61/896,896 filed on Oct. 29, 2013, U.S. Provisional Application No. 61/898,054 filed on Oct. 31, 2013, and U.S. Provisional Application No. 61/938,881 filed on Feb. 12, 2014. The entire disclosures of each of the above applications are incorporated herein by reference.

FIELD

The present disclosure relates to a system for additive manufacturing and, more particularly, to a system and method of selectively sintering a mixture of powders using micro-induction sintering.

BACKGROUND

This section provides background information related to the present disclosure which is not necessarily prior art.

Current processes for producing high purity bi-component materials, such as refractory metal parts, include powder and ingot metallurgy. The ingot metallurgy process begins with selecting and blending suitable powders, pressing into bars, and sintering. An electron beam or plasma or arc furnace is used to melt the bar in an inert atmosphere and cool it into an ingot. The melting can be done in multiple steps. Electron beam melting and re-melting removes impurities to produce an essentially pure ingot. The ingot is thermo-mechanically processed and further cold or hot worked as needed (or cold worked with intermediate annealing) to produce a desired shape such as plate, sheet, rod or fabricated. Components may also be machined directly from ingots.

The sintering process consumes a significant amount of furnace time, but it is required to provide sufficient mechanical strength in the bars and is a preliminary deoxidation step for the refractory metal powder, such as tantalum. The bars are usually electron beam-melted under a hard vacuum to remove impurities. The electron beam melting process can also consume a significant amount of furnace time and power.

Laser additive manufacturing is a direct deposition process that uses a high power laser and powder feeding system to produce complex three-dimensional components from metal powders. The high power laser and multi-axis positioning system work directly from a CAD file to build up the component using a suitable metal powder. This process is similar to conventional rapid prototyping techniques such as stereolithography, selective laser sintering (SLS), and laser welding. Laser welding was developed to join two components or to fabricate an article integral to a component. Such a laser process has been used to manufacture near-net shape titanium components for the aerospace industry.

To date, an additive manufacturing process does not exist for higher temperature bi-component refractory and tooling materials, or bi-materials, where one material is sensitive to the high energy applied by the laser. The application of a directed high-energy beam to a powder mixture can cause damage to one or more of its constituent components. In this regard, this energy can cause undesired phase and structural changes within one or both of these component materials. As an example, superconductors encapsulated into a metal matrix are highly sensitive to the application of a laser induced energy which may destroy their superconducting capabilities. Additional problems can occur when the application of a laser to a powder mixture leads to undesired chemical reactions between the materials. As such, there is a need for an additive manufacturing system which overcomes some of the deficiencies listed above and allows for a more creative combination of materials.

SUMMARY

This section provides a general summary of the disclosure, and is not a comprehensive disclosure of its full scope or all of its features.

According to the present teachings, a method for forming a component is presented. The method includes determining a frequency of an alternating magnetic field to induce eddy currents sufficient to bulk heat individual particles in a powder. The alternating magnetic field is applied at the determined frequency to a portion of a first layer of the powder using a flux concentrator. Exposure to the magnetic field changes the phase of at least a portion of the powder to liquid. The liquid portion when cooled couples to at least some of the powder and subsequently solidifies to provide the component. A change in reflected power associated with the phase change is calculated to determine whether there has been a coupling of the alternating magnetic field to the powder and the quality of the component formation.

According to alternate teachings, a method for forming a component is presented. The method includes selectively applying a magnetic field having a frequency greater than 10 MHz to a first portion of a layer of a powder mixture to selectively melt the first portion. The method also includes measuring a change in a reflected signal to determine a quality parameter for the component.

According to further teachings, a method of forming a component from a mixture of first and second particles is presented. The method includes selectively applying an RF magnetic field to a first portion of the powder mixture. An RF signal is applied through a tank circuit to a flux concentrator at a frequency and field strength sufficient to cause the melting of a portion of the first particles.

According to another teaching of the present disclosure, a method for forming a component is presented. The method includes providing a layer of a mixture of first and second particles, the first particles having a first particle size distribution. The method includes applying a high frequency magnetic field to a first portion of the layer. The high frequency magnetic field has a plurality of frequencies between a first frequency corresponding to a first portion of the first size distribution, and a second frequency corresponding to a second portion of the size distribution. A change in reflected power is measured to determine the quality of the sintering.

According to another teaching of the present disclosure, a method of forming a component from a mixture of first and second powder materials is disclosed. The first powder material has a first resistivity and the second material has a different second resistivity. The method includes applying a high frequency magnetic field to a first portion of the powder mixture so as to cause at least a portion of the particles in the first powder material to melt, and measuring a change in power of the high frequency magnetic field absorbed by the powder through time.

According to another teaching of the present disclosure, a method of forming a component from a mixture of first and second powder materials is disclosed. The method includes forming a first layer of a material of the mixture of particles. Next, a high frequency magnetic field is applied to a first portion of the first layer so as to cause a first set of particles in the first portion to melt. Next, a second layer of the mixture of particles is disposed over and in contact with the first layer. A second high frequency magnetic field is selectively applied to a second portion of the second layer to cause a second set of particles to change phase from solid to liquid. During the application of the magnetic field, a change in reflected field power is calculated to determine the completeness of the phase transformation. When the sintering is completed, the first portion is coupled to the second portion.

According to another teaching, the method above includes applying a plurality of magnetic fields having between a first frequency and first power level, and a second frequency and second power level to the first portion of the first layer using an air core flux concentrator so as to effect the melting of powder particles having one of varying size and resistivity.

According to another teaching, a system for forming a component is provided. The system includes a bed configured to hold a first layer of a mixture of metal powder, and a magnetic flux concentrator having at least one inductor loop powered by a high frequency tank circuit configured to apply a magnetic field at a frequency and field strength necessary to melt a first portion of the powder within the first layer.

The system further includes a mechanism for applying a second layer of a second mixture of material in contact with the first layer. The system then applies a second magnetic field to the second layer to melt a second portion of the second layer, where the second portion is fused to the first layer when the second magnetic field is removed. A change in power of the magnetic field absorbed is calculated to determine if the sintering is complete or if there is a defect in the material or component. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 represents a schematic representation of the additive manufacturing system according to the present teachings;

FIGS. 12a and 12b represent a simulation of the output of the circuit shown in FIG. 9;

FIG. 13 represents a multi-loop micro-induction flux concentrator;

FIG. 15 represents a resonant tank circuit for a micro-inductive sintering concentrator interacting with sintering powder;

FIG. 16 represents a block diagram of a voltage standing wave ratio test system configured to evaluate the status of a sintering process;

FIG. 17 depicts an alternate flux concentrator according to the present teachings;

Figure 19A:
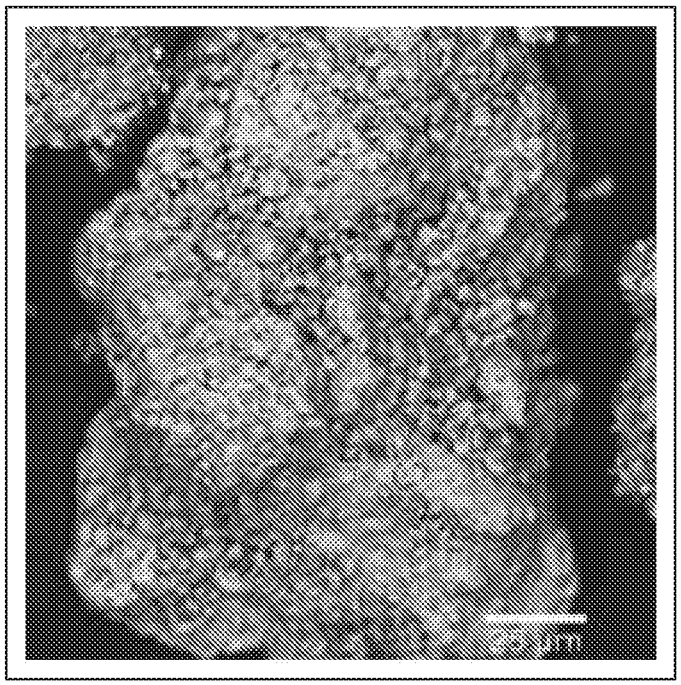
Figure 19B:
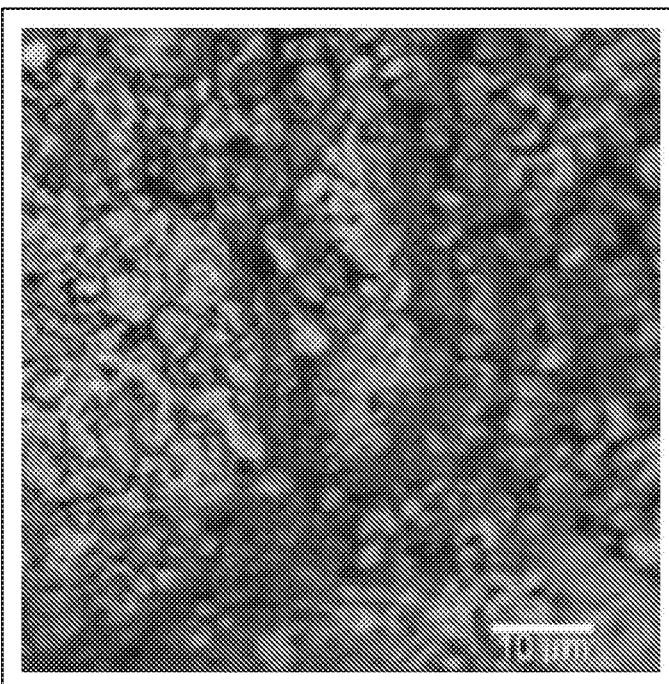
Figure 20:
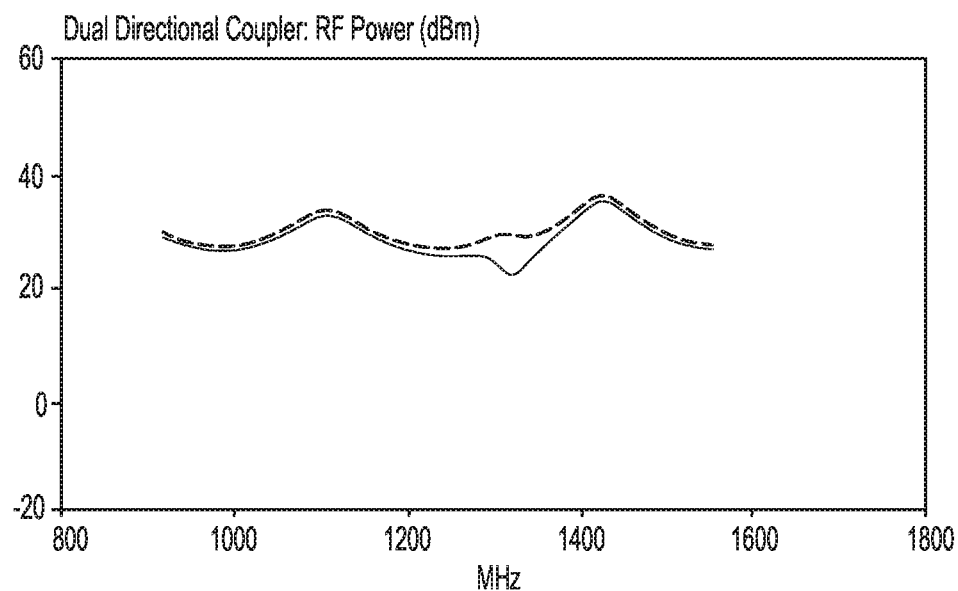
Figure 21:
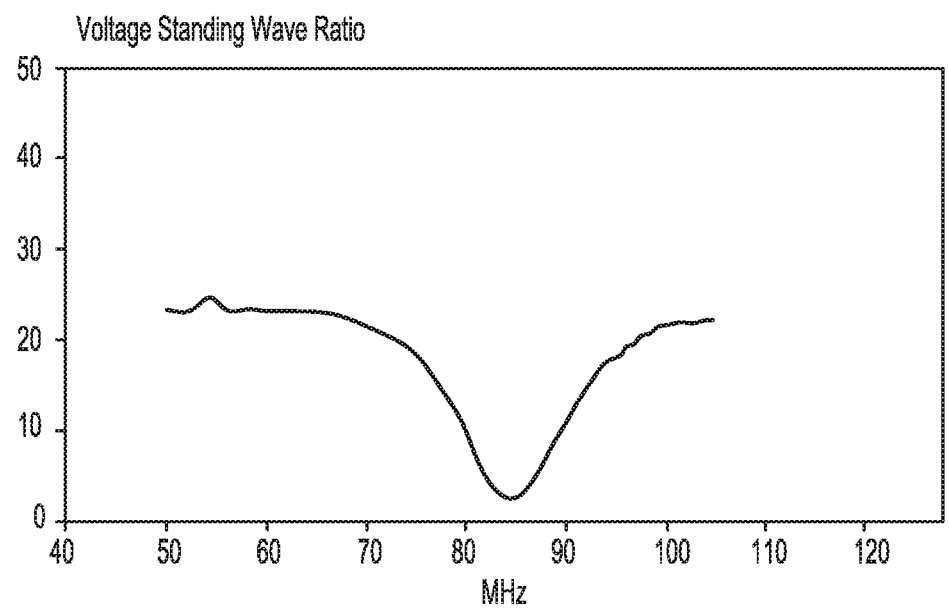
Figure 22B:
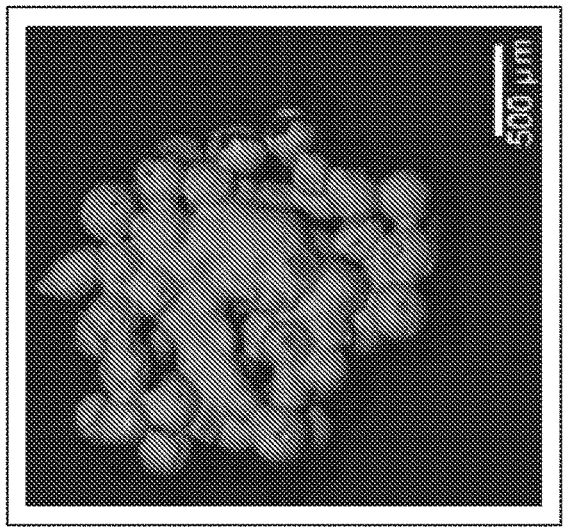
Figure 22C:
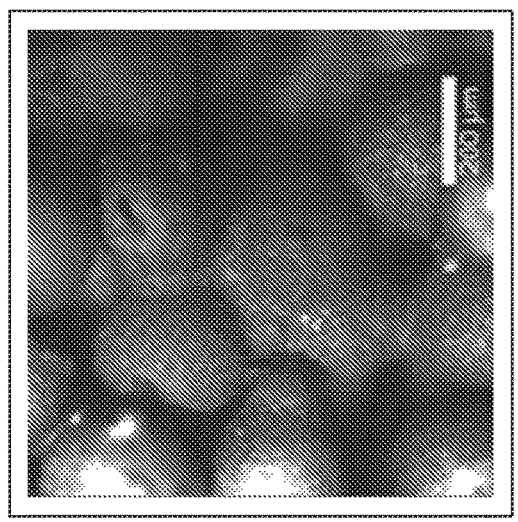
Figure 22A:
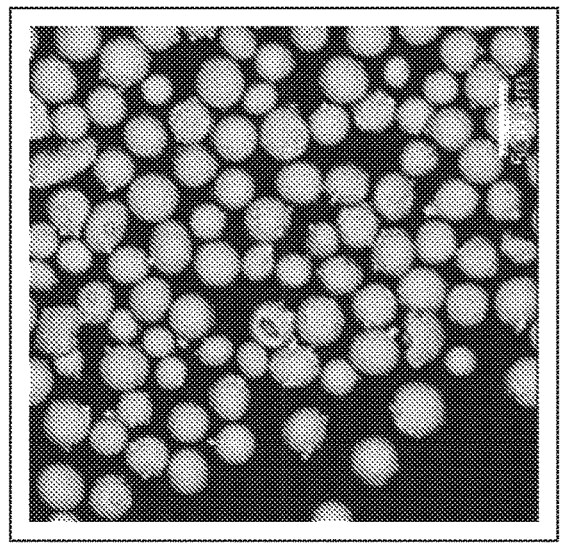

FIGS. 19a and 19b shown SEM images of powder sintered according to the present teachings;

FIG. 20 represents the forward and reflected power spectrum of the induced magnetic field applied to a powder bed according to the present teachings;

FIG. 21 represents the measured VSWR of the micro-inductive sintering flux concentrator;

FIGS. 22a-22c represent pre and post processing photos of materials processed according to the present teachings; and FIGS. 23a-23c are schematic representations of the formation of a component using additive manufacturing techniques.

Corresponding reference numerals indicate corresponding parts throughout the several views of the drawings.

DETAILED DESCRIPTION

Example embodiments will now be described more fully with reference to the accompanying drawings.

FIG. 1 depicts a system 10 for producing a component 11 using an additive micro-inductive sintering method in which layers of a mixture of powder 12 are consolidated. A powder holding tray or bed 13 retains the mixture of powder 12. Disposed above the tray 13 is a gantry 15 which supports a magnetic flux concentrator 17. A power supply and wave form generator 19 provides energy to magnetic flux concentrator 17 to apply a distinct, high frequency alternating magnetic field to selectively heat individual particles of the mixture of powder 12.

System 10 further includes a mechanism 21 having a pouring spout and leveling mechanism that recursively places layers of the mixture of powder 12 over previously consolidated portions of the mixture of powder 12. Also shown is a sensor 25 that detects information such as the transfer of energy to the mixture of powder 12 and the degree of consolidation.

Unlike laser or electron beam based additive manufacturing techniques in which the metal powder is heated indiscriminately by an external energy source, the system 10 uses micro-induction sintering for the selective heating of individual particles by tailoring the frequency of an applied magnetic field. During micro-induction sintering, the system 10 applies a localized high frequency magnetic field produced over an upper surface of the powder bed using the flux concentrator 17. System 10 causes a rapid heating of individual particles followed by a rapid cooling of the consolidated material due to a decoupling of the high frequency magnetic field from the melted particles that no longer exhibit the particle size being excited.

Heating of metallic particles within the mixture of powders 12 by induction is a result of both Joule heating due to eddy currents in non-magnetic metallic particles and hysteresis loss in magnetic particles, both of which result from the application of a high frequency magnetic field. For non-magnetic metals, eddy currents flow within a certain distance from the surface of the material.

$$\delta = \sqrt{\frac{\rho}{\pi f \mu}} \qquad [1]$$

The distance within the metal at which the eddy current is reduced to approximately 37% of the value at the surface is called the skin depth δ and can be written as where ρ is the resistivity and p is the permeability of the material, and f is the frequency of the magnetic field. In order to completely heat a metal particle by induction, the particle is immersed in a high frequency magnetic field such that the skin depth is approximately one half the diameter of the particle. Generally, high power transfer to the particle occurs near a diameter approximately four times the skin depth for simple geometries such as plates and cylinders with the magnetic field parallel to the axis of the part. For spheres, it is expected this ratio of the particle diameter to the skin depth would be higher.

Figure 2C:
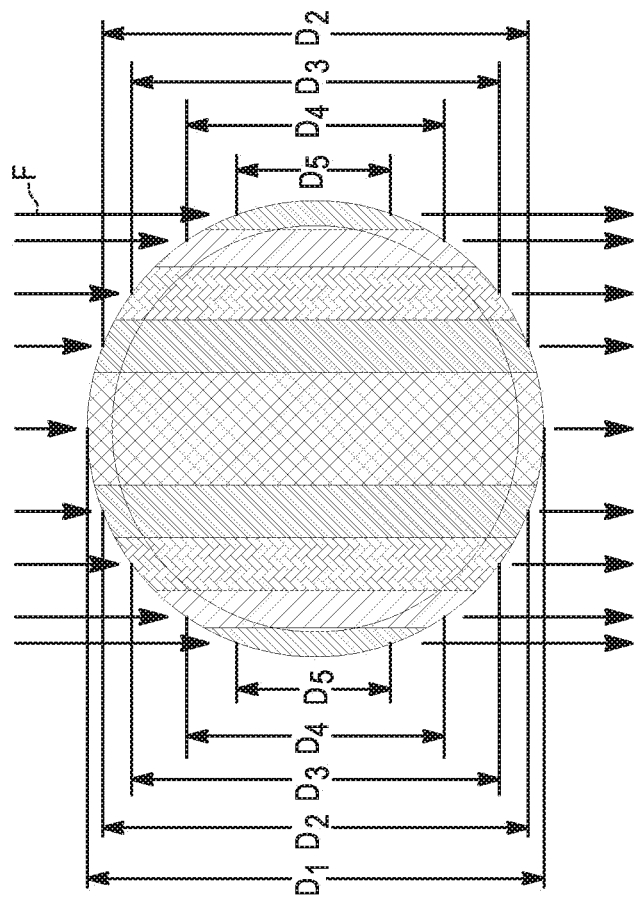
FIGS. 2a-2d represent the application of micro induction heating to particles according to the present teachings.
Figure 2B:
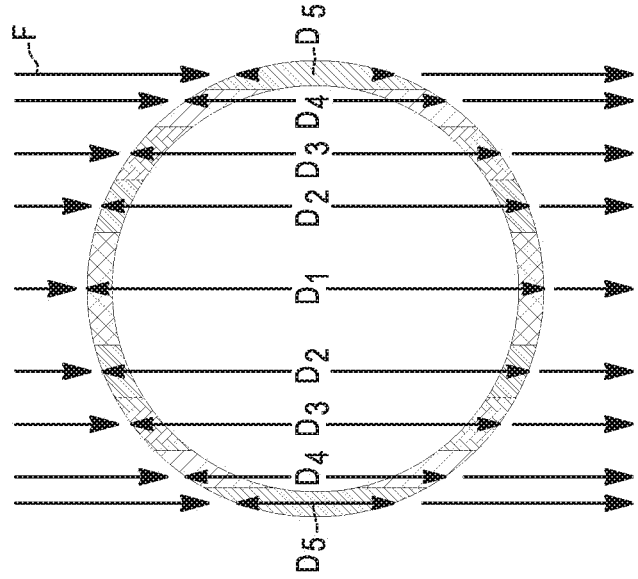
Figure 2A:
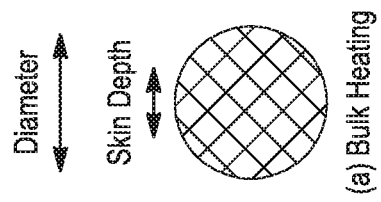

FIG. 2a depicts the heating of a single particle, by induction. The diameter of the particle is approximately 2δ. In this case, the eddy currents penetrate deep into the particle and bulk heating of the entire particle occurs by induction and heat transfer through the particle at a single frequency. Due to particle size distributions as well as particle shape anomalies, a band of frequencies is preferred to sinter a mixture of powders 12.

FIG. 2b depicts when the diameter of the particle is much larger than δ. Due to the directional nature of the magnetic field, only a portion of the particle outer skin is melted corresponding to the skin depth δ. For given resistivity and particle sizes, the melting can occur either only at the surface or through an entire circular layer of the particle (see FIG. 2c). A band of frequencies can be applied to correspond to various hemispherical diameters $D_1$-$D_5$ at different circles of the sphere. In the examples depicted in FIGS. 2b and 2c, the frequencies applied can vary from 1 to about 5 times the frequency calculated to melt the largest diameter for a given particle having a specific resistivity.

FIG. 2c depicts when a band of frequencies are applied to melt a set of cylindrical disks through the particle. In this example, $D_1$-$D_5$ correspond to frequencies which form a skin depth of approximately 2δ. Optionally, to melt the particle, the frequency band of the magnetic field F need not completely cover each of the frequencies corresponding to diameters $D_1$-$D_5$. Melting of the whole or a sufficient portion of the particle can occur by applying frequencies corresponding to skin depths, for diameters $D_2$ and/or $D_3$, where melting the entire particle, or surface of the particle occurs through heat conduction. The heat energy required to melt the remainder of the particle transfers through the particle via normal heat diffusion processes.

Figure 2D:
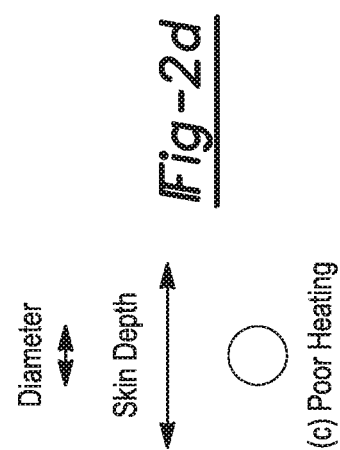

In FIG. 2d, the skin depth is much larger than the diameter of the particle and the eddy currents largely cancel in the particle. In this case, the particle does not couple well to the alternating magnetic field and the material absorbs very little power. It is envisioned the system would use frequencies such that the heating would be completed as shown in FIGS. 2a-2c. There is little heating of the particle at frequencies depicted in the case shown in FIG. 2d.

For simple shaped (e.g. flat or cylindrical) materials placed in a uniform alternating magnetic field, the power absorbed by the particle $P_w$ can be:

$$P_w = \frac{\rho}{\delta}AKH^2 = AKH^2\sqrt{\pi f \mu \rho} \qquad [2]$$

Where ρ is the resistivity of the material, δ is the skin depth, A is the particle surface area exposed to the magnetic field, K is a power transfer factor that depends on particle geometry, and H is the magnetic field strength. It should be noted that resistivity changes as a function of temperature and, as such, it is envisioned that the Pw may be adjusted through time depending upon changes in static and dynamic thermal conditions during the formation of a component. It is possible to calculate the power absorbed by a given metallic particle in an induction heating process using modern finite element analysis methods. As a rule of thumb, with a fixed resistivity, magnetic permeability and particle dimensions, the power absorbed by the particle in an induction heating process increases with increasing frequency and magnetic field strength.

The only ill-defined quantities are A and K, which describe how well the high frequency magnetic field couples to the individual particle. For any given slice through an approximately spherical particle, d/δ can be calculated from the particle diameter at that slice. The power transfer factor K, on the other hand, depends on the "electrical dimension" of the portion of the particle being heated, which is defined as the ratio of the diameter of the particle to the skin depth, d/δ.

Figure 3:
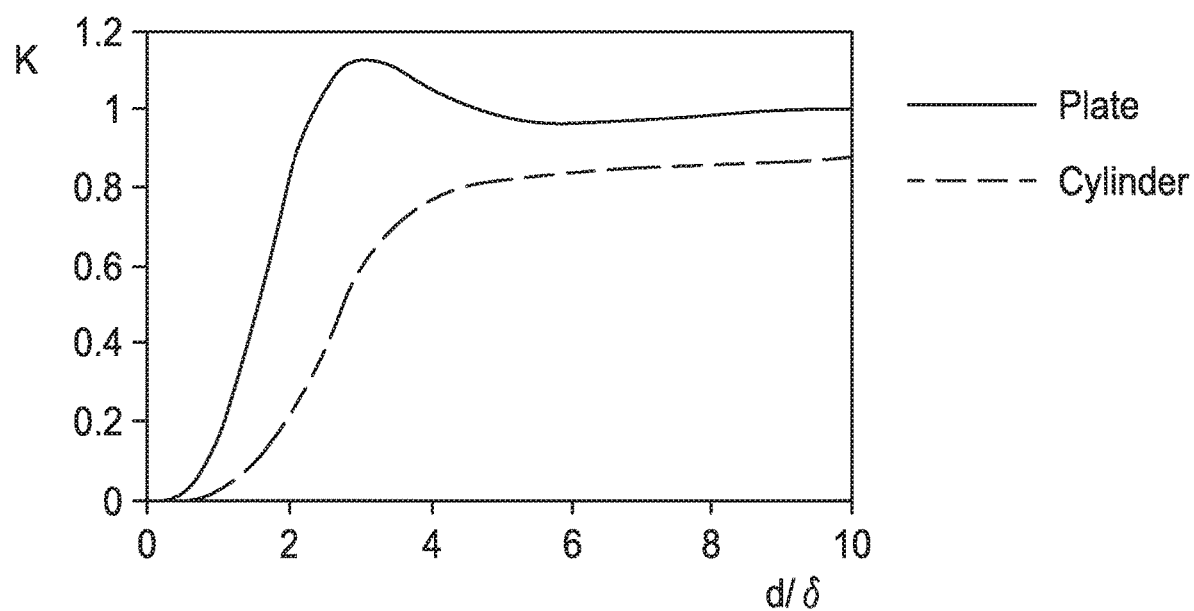
FIG. 3 represents a graph representing power transfer factors for a material subjected to micro induction heating.

FIG. 3 represents a graph representing power transfer factors for materials subjected to micro induction heating. Power transfer factors for two cases of a plate and a cylinder are shown. Using the plate geometry as a crude model for roughly spherical particles, it is seen that K approaches unity if the skin depth is much smaller than the thickness of the particle. For example, when d~2δ, K is approximately 0.8. The system utilizes the functional dependence of K(d/δ) for determining the appropriate frequency or frequencies for the selective heating of individual particles in a composite material. The system 10 utilizes two conceptual composite architectures with an emphasis on the selective heating of individual components of the composite component during the consolidation process. Accordingly, the selectivity of the system's micro-inductive sintering is based both on the size and material properties of the particles in the powder.

Figure 4C:
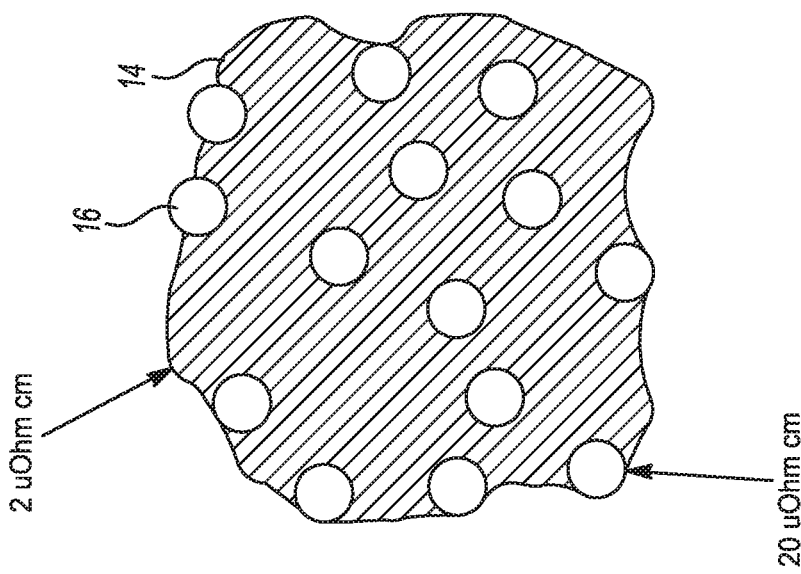
FIGS. 4a-5c represent micro induction sintering according to the present teachings.
Figure 4B:
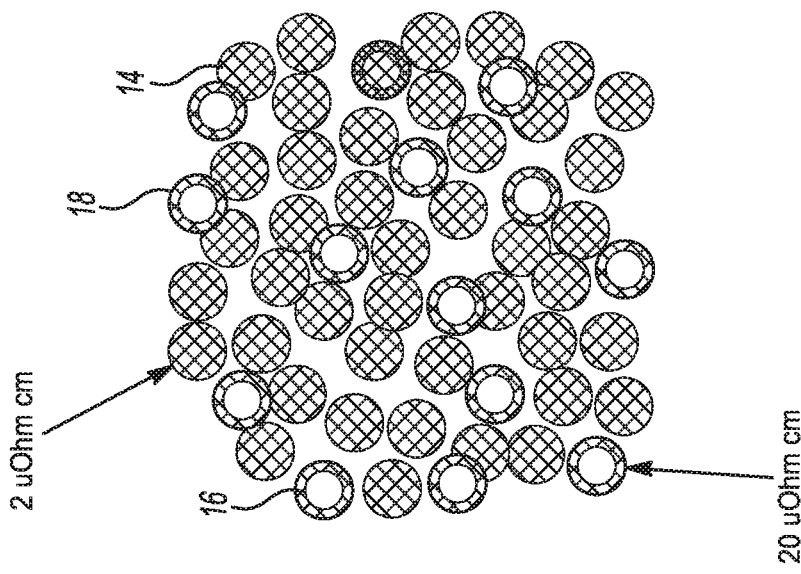
Figure 4A:
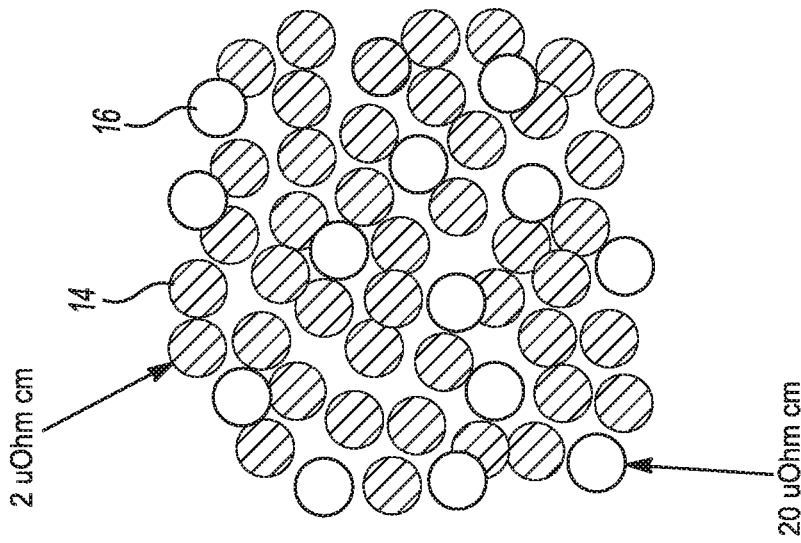

FIGS. 4a-4c illustrate the application of micro-inductive sintering to a mixture of two mono-sized dispersed metal powders. In FIG. 4a, the powder mixture 12 consists of a first material 14 and a second material 16 with approximately the same particle size or particle size distributions, but with different material properties. The resistivity ρ of the particles of the first material 14 is ten times greater than the resistivity of particles of the second material 16. Assuming that bulk heating of the particles occurs when d/δ equals 4, the induction frequency can be:

$$f = \frac{16\rho}{\pi\mu d^2} \quad [3]$$

where d is the diameter of the particle.

Thus, for a given particle size and magnetic permeability, the induction frequency to achieve bulk heating of a particle scales linearly with the resistivity of the material. In this case, the particles of the first material 14 can be selectively heated in bulk using an oscillating magnetic field with a frequency ten times smaller than that which would be used to bulk heat the particles of the second material 16. This is illustrated in FIG. 4b, which explicitly shows the selective bulk heating of the particles of the first material 14 as indicated by double cross-hatching. FIG. 4b depicts the heating of the particles of the first material 14 where the frequency of the magnetic field is set such that the skin depth is approximately one half the diameter of the particle. The skin depth of the particles of the second material 16 is approximately $(10)^{0.5}$~3.2 times that of the first particle at this frequency. Since the skin depth in the second particle is much larger than the particle diameter, there is very poor coupling to the high frequency magnetic field and these particles are not heated directly by induction. Note that the particles of the second material 16 are also heated in this process, but only by conduction and convection heating which results from the induction heating of the particles of the first material 14. As such, only an outer portion 18 of the particles of the second material 16 are heated as depicted by double cross-hatching. The selective sintering of powders that possess similar particle size distributions, but different materials properties can be used to inform the power levels and frequencies needed for micro-inductive sintering.

FIG. 4c represents a portion of a consolidated component 11 where the previously heated and melted particles of the first material 14 have now cooled after completion of the selective sintering process. It should be noted that the isolated particles of the second material 16 remain as inclusions within the recently formed solid of the first material 14. Upon consolidation of the particles of the first material 14, the effective domain size of the first material 14 increases such that the high frequency magnetic field tuned to the initial diameter of the particles of the first material 14 no longer couples well to the first material 14. In this case, the effective particle size is much larger than the skin depth at this frequency and the entire consolidated domain is heated only at the surface as previously described in relation to FIG. 4b.

In one exemplary manufacturing method, the bed 13 of the mixture of powder 12 may be heated to a temperature near the melting temperature of the particles of the first material 14. Only the very low overall additional energy needed to melt the powder 12 need be inputted into the powder bed 13 by the flux concentrator 17 to selectively melt the particles of first material 14. The additional energy is localized to the active micro-inductive sintering zone near a gap 23 in the flux concentrator 17. For example, high frequency induction of eddy currents in a metallic binder (particles of the first material 14) allows for the selective heating and subsequent consolidation of a ceramic/metal matrix composite without the associated heating and degradation of the ceramic constituent (particles of the second material 16). This makes it possible to consolidate composites composed of very heat-sensitive ceramic particles (e.g., superconducting materials).

The coupling and de-coupling of the high frequency magnetic field based on the domain size of the metallic material is a unique and novel feature specific to the micro-inductive sintering process of the present disclosure. This property allows for real-time diagnostics of the micro-inductive sintering consolidation process through the monitoring of the forward and reflected power to the powder bed. In addition, this process allows for the rapid and automatic de-coupling of the external heat source (i.e. the high frequency magnetic field) upon consolidation of the particles. This is a desirable control feature in the consolidation of heat sensitive materials or composite materials that may degrade upon exposure to elevated temperatures.

As previously stated, the selectivity of the system's micro-inductive sintering is based both on the size and material properties of the particles in the powder. The metal powder shown in FIG. 5a consists of a bimodal distribution of first particles 22 and second particles 24. The second particles 24 are the larger of the two particles having approximately twice the diameter of the smaller first particles 22. Again, either the smaller or larger particles may be selectively heated by the induction frequency, where it is seen that the induction frequency varies as a function of size. Thus, a twofold increase in particle size implies a fourfold decrease in the frequency of the oscillating magnetic field necessary to achieve bulk heating, assuming the optimum "electrical dimension" for heating the particles was equal to 2.

Figure 5C:
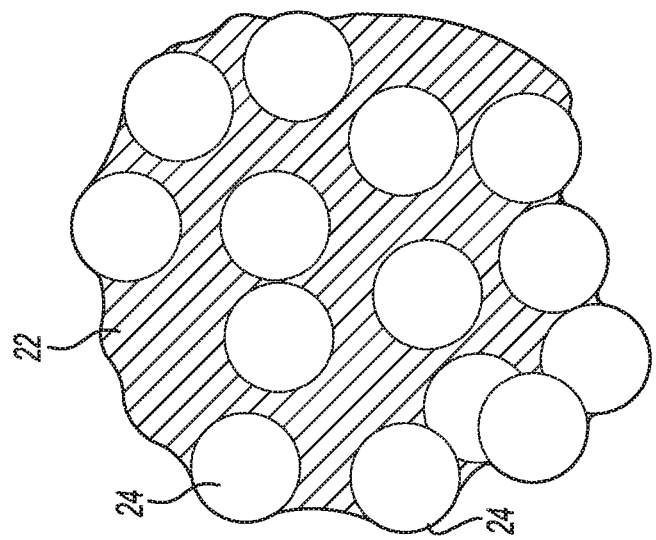
Figure 5B:
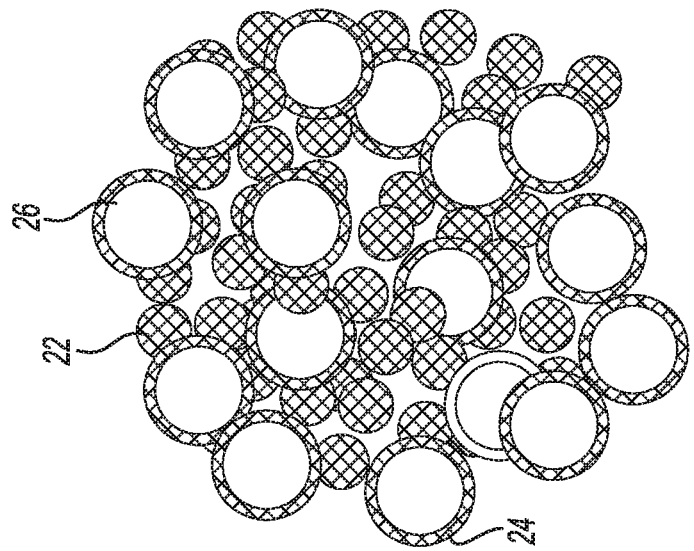
Figure 5A:
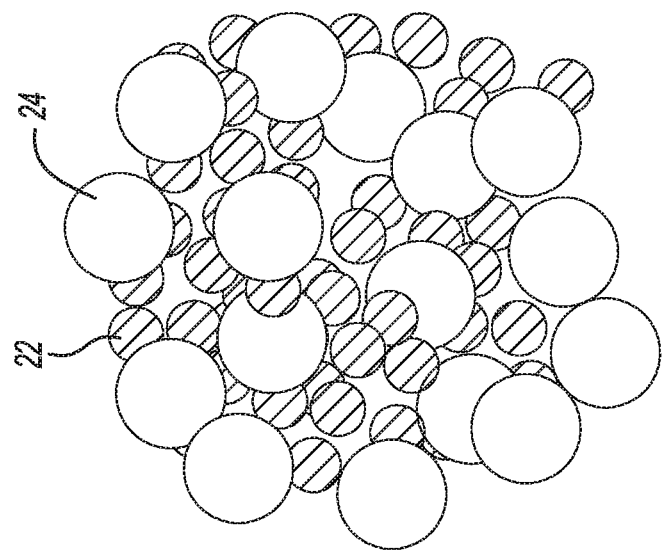

FIG. 5b illustrates the bulk heating of the smaller first particles 22 and the surface heating of an outer portion 26 of larger second particles 24 which is characteristic of the micro-inductive sintering process. Using a narrow bandwidth of fixed frequencies, complete consolidation of the effected region is shown in FIG. 5c. As in the previous example, upon consolidation of the particles, the effective domain size of the material increases and the high frequency magnetic field tuned to the initial diameter of the smaller first particles 22 becomes de-coupled from the consolidated material and the entire domain is heated by induction only at the surface.

In the composite architectures previously described, the frequency of the induction heating process is used to selectively heat specific components of the composite based on the physical or materials characteristics of the powder. In the prior example, the small first particles 22 are selectively heated by induction, which results in the consolidation of the material. By changing the frequency or spectrum of the magnetic field, however, the large particles could have been selectively heated by induction, which may lead to an improved density of the final part. In practice, the specific sintering characteristics of the material and the desired material properties of resultant material will determine the micro-inductive sintering frequency spectrum. Overall, the micro-inductive sintering approach allows for enhanced control of the densification process by targeting small particles, or large particles that can be partially or entirely melted. This control adds another tool in the toolbox for the effective consolidation of powders suitable for use in additive manufacturing.

By selective application of the magnetic fields, micro induction sintering produces complex parts and components directly from advanced metal and ceramic/metal matrix composite powders. The micro-inductive sintering process, however, is not without limitations imposed by the system electronics, the magnetic properties of the magneto-dielectric material used to fabricate the flux concentrator 17, the specific sintering characteristics of the metallic powders, and the fundamental physics of induction heating. In general, the micro-inductive sintering processing is preferable within the following operational parameters:

1) Materials with electrical resistivity between 1 µOhm cm and 200 µOhm cm.
2) Powders with particle sizes between 1 µm and 400 µm; and
3) Flux concentrator induction frequencies between 1 MHz and 2000 MHz.

Figure 6:
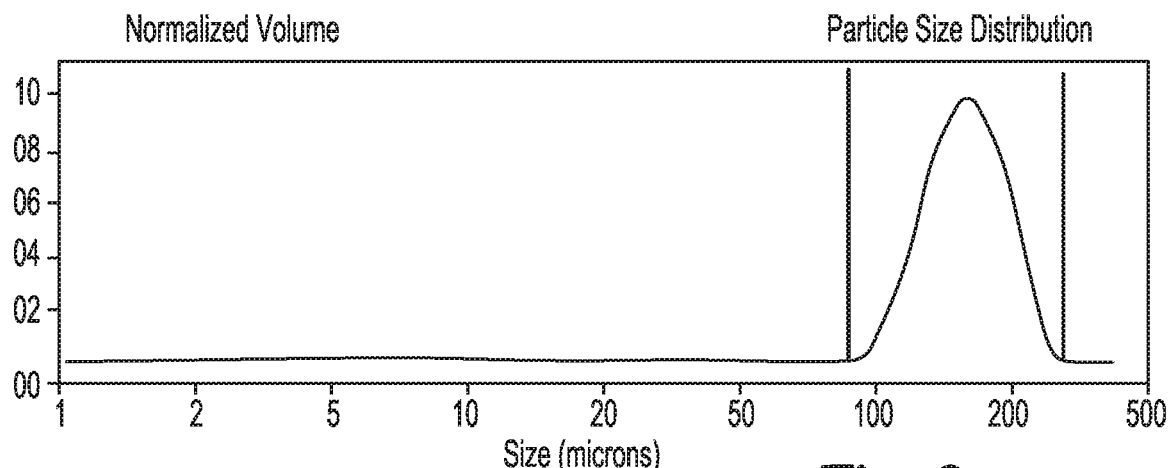
FIG. 6 depicts a simulated powder size distribution.

By way of non-limiting example, the sintering of a Ti-48Al-2Nb-2Cr powder, produced by TLS Technik GmbH & Co., is described below. FIG. 6 shows a simulated particle size distribution for the powder based on information obtained from the supplier. The simulated particle size distribution is used to determine the frequency range of the micro-inductive sintering power supply and design the high-power micro-inductive sintering flux concentrator circuit. Technical alloys, with high resistivities and high melting temperatures, present some unique challenges in the design of the overall micro-inductive sintering system.

Figure 7A:
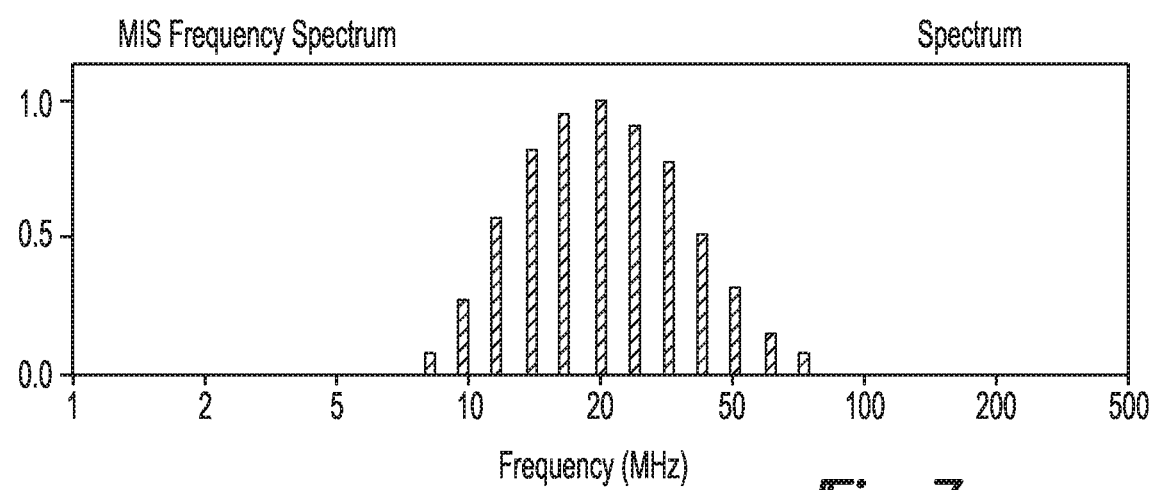
FIGS. 7a and 7b show calculated induction heating spectrums for a powder having the distribution shown in FIG. 6.

FIG. 7a shows the calculated induction heating spectrum for the powder using an estimated room temperature resistivity of 100 µΩ-cm and the d/δ~4 criterion. The frequency spectrum is calculated for particles with diameters between about 90 and 210 microns, and illustrates that a very broad frequency spectrum (e.g. ~10 to 60 MHz) is required to heat a powder with a relatively narrow (e.g. 100 to 300 µm) particle size distribution. The induction heating spectrum was calculated using the room temperature resistivity of 100 µΩ-cm. As the powder reaches sintering temperatures, however, the electrical resistivity and skin depth of the material will increase as prescribed by Equation [1]. Thus, in order to efficiently heat the particles at elevated temperatures, the induction heating spectrum must be shifted to higher frequencies. Optionally, this frequency shift can occur during processing of the component.

Figure 7B:
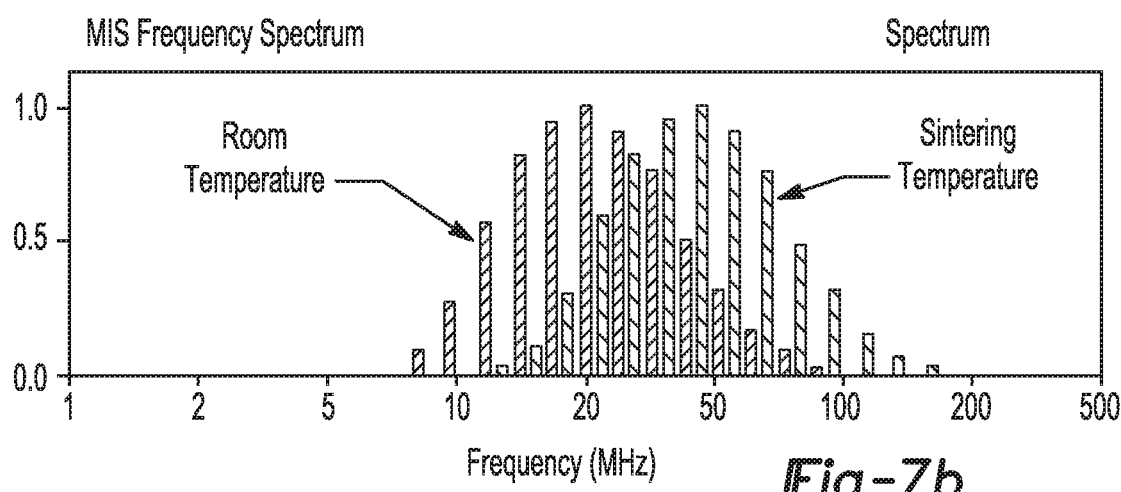

FIG. 7b depicts a calculation of the induction heating spectrum of the alloy at room temperature (i.e. 100 µΩ-cm) and the same material at sintering temperatures (i.e. 200 µΩ-cm). There is a significant shift to higher frequencies as the resistivity of the particles increases with temperature. Similarly, due to changes in the distribution of diameters of portions of the powder melted (see FIG. 2b), a frequency band representing 1-5 times the frequency calculated in equation [1] or portions can be used to melt the particles.

Unlike laser or electron beam additive manufacturing processes, the micro-inductive sintering process is tightly coupled to the electrical and physical properties of the metal powder. These specific materials characteristics can be taken into account in the design of the micro-inductive sintering flux concentrator and the associated RF electronics. In essence, the material to be consolidated determines the characteristics of the micro-inductive sintering system. For example, with a given resistivity and particle size distribution of a material, the operating bandwidth of the micro-inductive sintering system can be determined. This operating bandwidth then determines: the materials, inductance, and conductor geometry of the micro-inductive sintering flux concentrator which can be, for example, a magneto-dielectric material micro-inductive sintering flux concentrator (0.5 to about 3 MHz); a ferrite-based micro-inductive sintering flux concentrator (1 to about 50 MHz); or an air-core micro-inductive sintering flux concentrator (1 MHz to about 2.0 GHz). The micro-inductive sintering flux concentrator circuit drive topology can be, for example, a high-order ladder network (low power, medium bandwidth); a resonant tank circuit (high power, narrow bandwidth); or a variable tank circuit (medium power, wide bandwidth).

Figure 8:
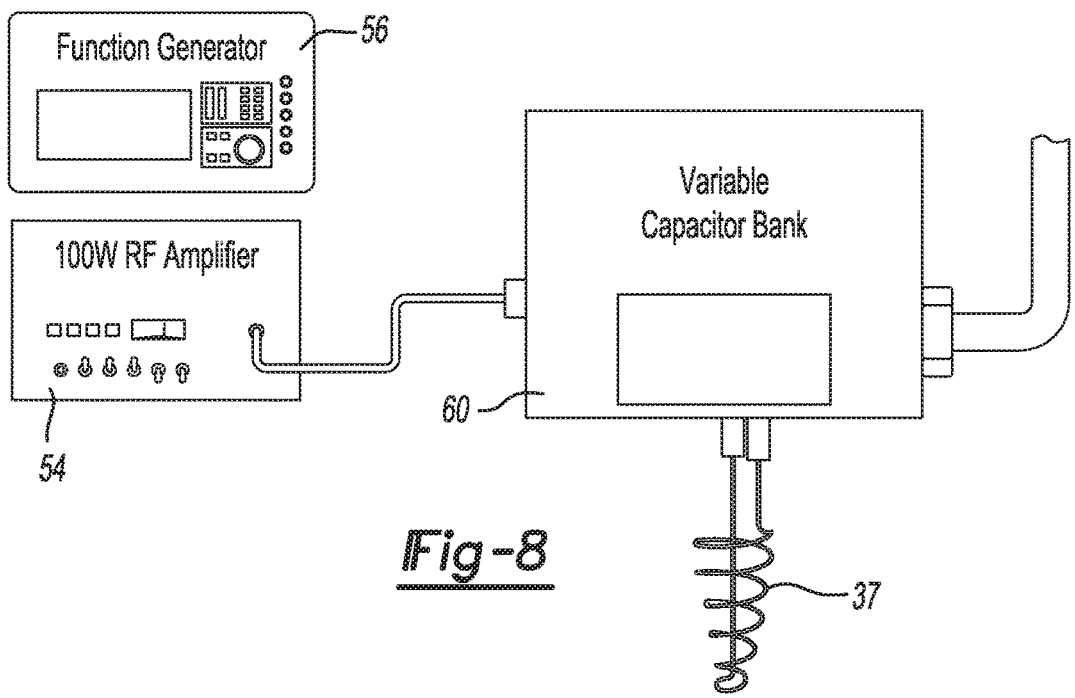
FIG. 8 represents a block diagram of the driving circuit for the micro-inductive sintering flux concentrator.
Figure 9:
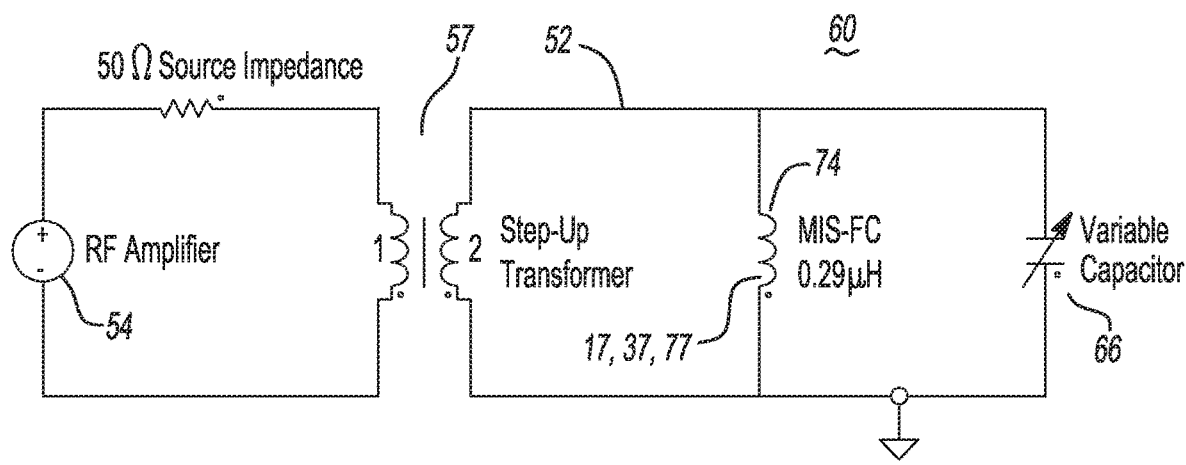
FIG. 9 represents a schematic resonant tank circuit configured to drive a flux concentrator.

A micro-inductive sintering flux concentrator system for the additive manufacturing system 10 is shown in FIGS. 8 and 9. The micro-inductive sintering flux concentrator system includes the RF signal generator 56 which can include a high frequency function generator (Rohde & Schwartz SMIQ02) capable of producing a swept high frequency sine wave from 300 kHz to 2.2 GHz. The output of the RF signal generator 56 is driven by a 100 W RF amplifier 54 (Amplifier Research 1OOW1000B) with a series impedance of 50Ω. The amplifier 54 is connected to a flux concentrator 37 (optionally, 17 and 77) that includes an inductor 74 parallel to a variable capacitor bank 66. As is typical in resonant tank circuits, all current leads between the inductor 74 coil and the variable capacitor 66 should be as short as possible to both minimize the stray inductance of the assembly and reduce any resistive losses. Alternatively, discrete capacitors, which could be inserted or removed from the tank circuit 60 using a high speed switching circuit, can be used. A selection of SuperChip multilayer capacitors available from American Technical Ceramics that can be used up to 500 MHz at approximately 1.5 kV. American Technical Ceramics also has high power RF capacitors that can function well above 3 GHz.

The variable capacitor 66 can be a bank of capacitors that are selectively combined to give a varying capacitance to the tank circuit. Alternatively, the variable capacitor can be an open air capacitor having interposed movable plates (not shown). Adjusting the capacitance of the variable capacitor 66 varies the resonant frequency of the circuit 60 (see FIGS. 10 and 11a-11b) and, as such, the frequency of the magnetic field applied to the powders 12. In a tank circuit 60 with a series of discrete capacitors, the resonant frequency will be fixed by the value of the capacitance inserted into the circuit 52. While more complex than the variable tank circuit 60 with the flux concentrator 37, the fixed-frequency resonant tank circuit 60 has the advantage of high speed operation at very high frequencies.

The driving tank circuit 60 can deliver approximately 5 A (peak) to the spiral coil inductor 74 of the micro-inductive sintering flux concentrator 37. The coil inductor 74 possess a bandwidth between 10 MHz to approximately 1400 MHz and can be "tunable" within that bandwidth to maximize current flow to the micro-inductive sintering flux concentrator 17 while minimizing the power draw from the RF amplifier 54.

This circuit 60 is intended to maximize the current flow to the micro-inductive sintering flux concentrator 17, 37, 77 at resonance, and also contributes to the real-time diagnostic features of the micro-inductive sintering process that is described in detail below. If the resonant frequency of the tank circuit 60 does not couple well with the particle size distribution of the powder (see Equation [3]), then there is no real resistive load in the tank circuit 60 and only reactive currents flow in the tank circuit 60. In this case, little power is drawn from the RF amplifier 54. If the resonant frequency of the circuit 60 couples well with the particle size distribution of the mixture of powder 12, however, a resistive load is introduced in the tank circuit 60 and power will be drawn from the amplifier 54. In principle, real power will flow in the tank circuit 60 only when the induction heating frequency (i.e. $f_R$) is such that the "electrical dimension" d/δ is large (see Equations [1] and [2]). The frequency dependence of the real power provided by the RF amplifier 54 using this circuit design can be directly related to the real-time diagnostics and qualification of the micro-inductive sintering method. In this way, a parameter defining the quality of a sinter or component can be defined.

Figure 10:
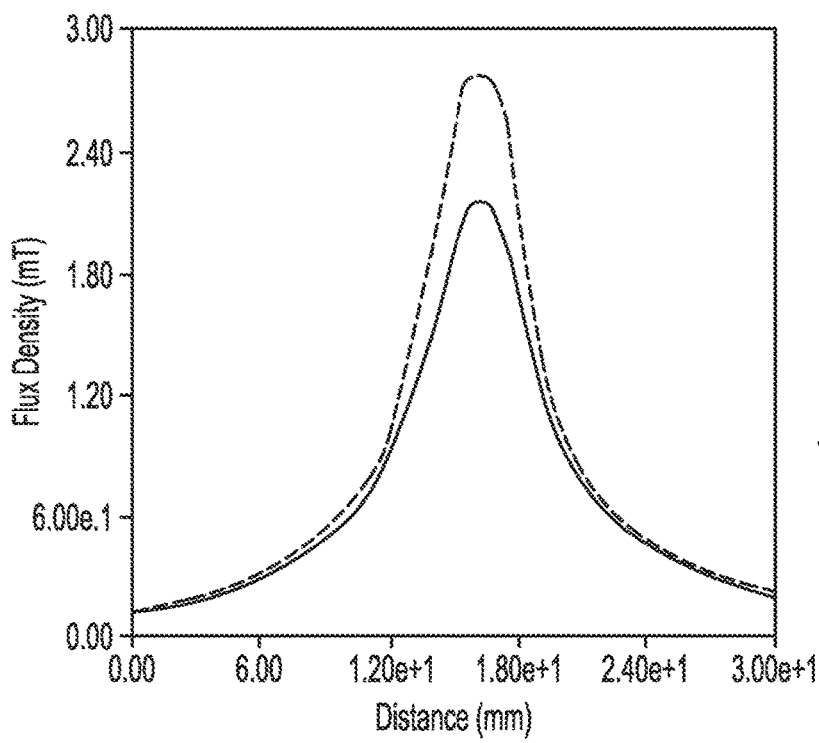
FIG. 10 shows flux density produced the drive circuit shown in FIG. 9.
Figure 11A:
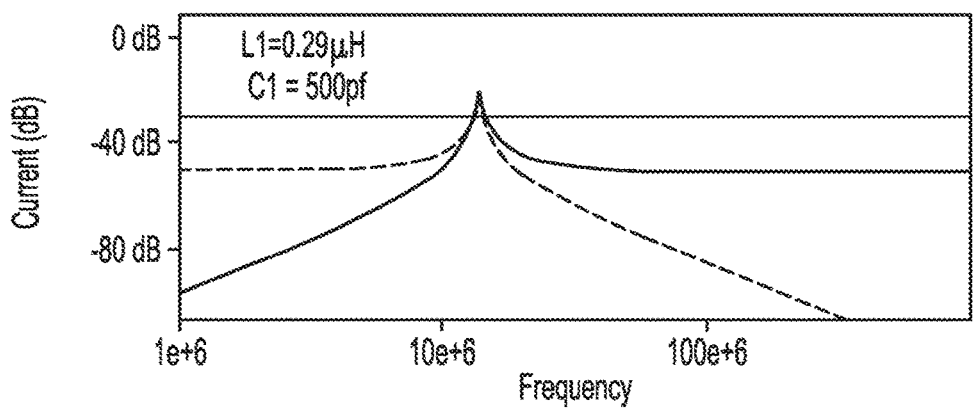
FIGS. 11a and 11b represent current vs. frequency response curves for the circuit shown in FIG. 9.
Figure 11B:
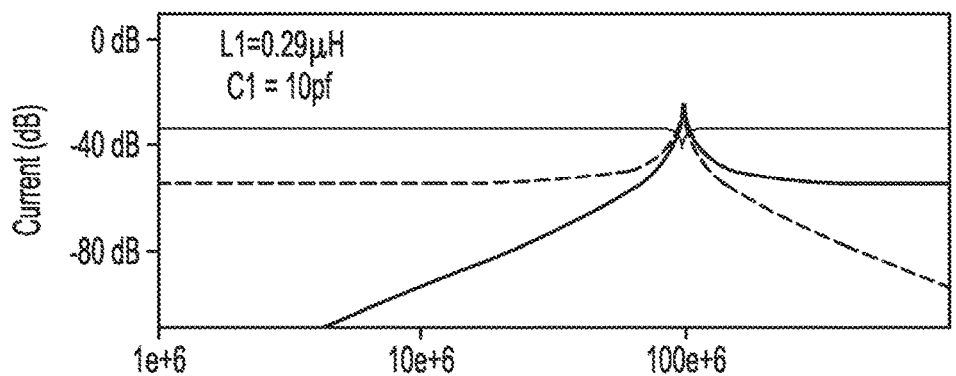

Generally, the strength of the magnetic field geometrically changes with distance from the tip of the micro-inductive sintering flux concentrator 17, 37, 77. As shown in FIG. 10, there is approximately 2.7 mT at 0.5 mm from the tip of the micro-inductive sintering flux concentrator 37, which decreases to approximately 2.1 mT at 1 mm. As shown in FIGS. 11a and 11b, the current flow in circuit 52 (in dB) is shown as a function of frequency for two values of the tank capacitance: 10 pf and 500 pf. In these simulations, R1 is the 50Ω source impedance, C1 is the variable capacitor 66, and L1 is the micro-inductive sintering flux concentrator 37. In FIG. 11(a), the tank capacitance is 500 pf and the circuit resonates at approximately 13 MHz. By reducing the tank capacitance to 10 pf, the resonant frequency increases to approximately 94 MHz. As can be seen, changing the capacitance of the tank circuit 60 allows for fast adaptation of the system based on size, material, and environmental parameters.

FIGS. 12a and 12b represent simulations of the current flows shown in FIGS. 11a and 11b with the fixed capacitance values of 10 pf and 500 pf. In these simulations, R1 is the 50Ω source impedance, C1 is the variable capacitor 66, and L1 is the micro-inductive sintering flux concentrator 37. As seen in the FIG. 12a, nearly 6 A (peak) flows through both the micro-inductive sintering flux concentrator and the capacitor 66 in the tank circuit 60 at 13 MHz; decreasing to approximately 5 A (peak) at 94 MHz (FIG. 12a). In this embodiment, the micro-inductive sintering flux concentrator 37 is energized with a minimum of 5 A, which is on the order of the current excitation required to generate a sufficient magnetic flux density to consolidate the powder.

FIG. 13 shows the geometry of the exemplary micro-inductive sintering flux concentrator 37 incorporated into the micro-inductive sintering system described below. This "air-core" flux concentrator 37 can be a tungsten evaporation basket 78 used to fabricate thin films in ultra-high vacuum atmospheres. This flux concentrator 37 can be purchased from a variety of vendors (e.g. R. D. Mathis, Ted Pella, Kurt Lesker, etc.). The tapered spiral geometry has single coils 70 of varying diameter which aids in the "focusing" of the flux density at the powder bed 13. The available flux density per ampere current is higher in this geometry as compared to straight solenoid geometries. Also, the adjacent turns of the spiral coil are well separated, which reduces the parasitic capacitance of the micro-inductive sintering flux concentrator 37. The coil can be fabricated from tungsten, which has a melting point of approximately 3422° C.—the highest of any elemental material. This means that the micro-inductive sintering flux concentrator 37 can be in very close proximity to the powder bed 13 and build area without the need for external cooling.

Figure 14:
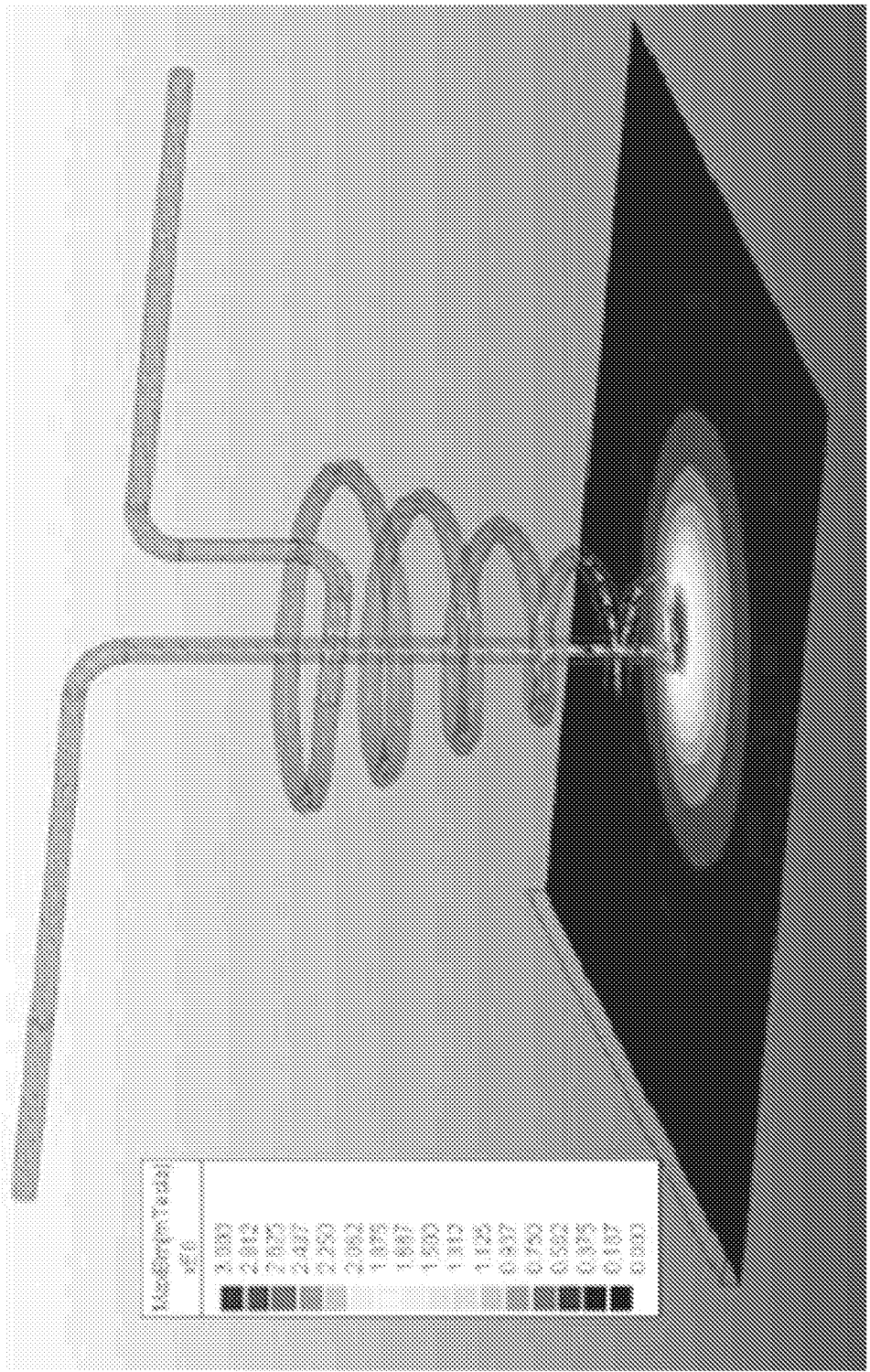
FIG. 14 represents a calculated flux density profile of the micro-induction flux concentrator shown in FIG. 13.

A 3D model of the micro-inductive sintering flux concentrator 37 was used to determine the flux density and inductance of the coil inductor 74. The inductance of the micro-inductive sintering flux concentrator 37 is calculated to be approximately 0.29 µH. FIG. 14 shows the calculated flux density profile of the micro-inductive sintering flux concentrator 37 shown in FIG. 13 using a 5 A (peak) excitation current. As seen, there is approximately 2.7 mT at 0.5 mm from the tip of the micro-inductive sintering flux concentrator 17, which decreases to approximately 2.1 mT at 1 mm. The full width at half maximum of the square of the flux density (i.e. proportional to the power transferred to the powder) is approximately 4 mm, which is relatively wide compared to micro-inductive sintering flux concentrators that incorporate magneto dielectric materials. This is primarily due to the final diameter of the single coils 70 in the tungsten basket 78. The flux density contour on a 20 mm×20 mm plane located 0.5 mm below the micro-inductive sintering flux concentrator 17, which illustrates that the localized magnetic field, is directly related to the winding geometry of the spiral coil 76.

The circuit 60 diagram for a 75 MHz micro-inductive sintering flux concentrator is shown in FIG. 15. In this circuit 60, the degree of coupling between the micro-inductive sintering flux concentrator 17, 37, 77 and the powder 12 is explicitly described by the mutual inductance, M. Here, M is a function of the surface area of the particles exposed to the high frequency magnetic field and the skin depth of the metallic powder at the resonant frequency of the tank circuit 60. If the micro-inductive sintering flux concentrator 17, 37, 77 is too distant from the metal powder, or the skin depth is much larger than the particle size, M will tend to zero and the only load in the tank circuit 60 will be due to the intrinsic AC resistance of the material of the inductor, $L_1$. The reactive current in the tank portion of the tank circuit 60 (i.e. between the capacitor and the micro-inductive sintering flux concentrator inductor 74) is sharply peaked at the resonant frequency, which can be shown to be:

$$f_R = 1/(2\pi\sqrt{LC}) \quad [4]$$

where L is the inductance of the micro-inductive sintering flux concentrator (L1) and C is the capacitance of the variable capacitor 66 (C1) in parallel to L. At $f_R$, very large reactive currents flow between the capacitor bank 66 and the micro-inductive sintering flux concentrator 17, 37, 77 but the only power dissipated in the tank circuit 60 is due to the resistive loss in R1 and R3 when K is zero. With a non-zero M, increased power is drawn from the amplifier 54 as power flows to the metal powder bed $L_2$, $R_2$. In general, the magnitude of these resistive and reactive currents depends on the voltage available from the amplifier 54 and the reactive current available from the capacitor at $f_R$.

The micro-inductive sintering flux concentrator tank circuit 60 minimizes the power draw from the RF amplifier 54 by operating near the resonant frequency at all times. In principle, this increased power will flow in the circuit only when the induction heating frequency (i.e. $f_R$) is such that the "electrical dimension" d/δ is large. The frequency dependence of the real power provided by the amplifier 54 can be directly related to the real-time diagnostics and qualification of the quality of the micro-inductive sintering method and a produced component. Additionally, it can be used to test the quality of the powder being sintered.

A convenient method to determine the power transfer from a source to a load is to measure the Voltage Standing Wave Ratio (VSWR) of the flux concentrator 17. The VSWR is a measure of the amplitude of the reflected RF wave relative to the incident RF wave between an RF power supply and a device under test. In general, the VSWR can be calculated by measuring the reflection coefficient Γ of the sintering flux concentrator 17, which can be written as, $$\Gamma = \frac{V_{reflected}}{V_{incident}}$$

where;

$$VSWR = \frac{1+|\Gamma|}{1-|\Gamma|}$$

is the voltage of the reflected and incident waves, respectively. As $\Gamma$ is always between 0 and 1, the VSWR has a minimum of unity, which corresponds to 100% power transferred from the source to the load, which corresponds to approximately 64% of the power transferred to the load with 36% reflected back to the power supply.

A block diagram of the VSWR measurement system 96 is shown in FIG. 16. The VSWR of micro-inductive sintering flux concentrator components is directly measured in order to confirm the operation of these components for use in the micro-inductive sintering system. This calculation can be used to determine a quality parameter for the powder, the equipment, or raw materials. The system consists of an RF signal generator 56, amplifier 54, dual directional coupler 62, and two spectrum analyzers 64. The RF signal generator 19 drives a known RF sine wave to the amplifier 54, which is connected to the micro-inductive sintering flux concentrator 17, 37, 77 through a dual directional coupler 62.

The RF power available from the forward and reflected ports on the dual directional coupler correspond to the incident and reflected power to the micro-inductive sintering flux concentrator 17, which are measured by the two spectrum analyzers 64, respectively. The square root of the ratio of the reflected and incident power is equivalent to $\Gamma$ from which the VSWR ratio is calculated. The VSWR measurements are completely automated by a control code micro-inductive sintering system which can be used as a quality measure or a control signal in the additive manufacturing system 10.

Optionally, the VSWR measurement system 96 is configured to calculate a measurement of a change in power transferred to the powder 12 during a phase change in the powder. To do this, the VSWR measurement system 96 is configured to measure or calculate a change in reflected energy during the phase change in the powder within a predetermined frequency range. Optionally, the VSWR measurement system 96 can produce a control signal indicative of an acceptable sintering of the powder which can be used to control processing parameters in the additive manufacturing system 10.

FIG. 17 shows an alternate planar micro-inductive sintering flux concentrator 77 geometry that has been incorporated into the micro-inductive sintering system. This "air-core" flux concentrator can be fabricated from a 1 mm thick copper plate 82 and consists of a thin 0.25 mm slot 84 in communication with a 1 mm diameter loop 86 at the end. The loop 86 defines a single turn inductor 74 with an approximate inductance of 1 to 1.5 nH, which is over 100 times lower inductance than that of the flux concentrators 17, 37 described above. This copper plate 82 "solid-state" micro-inductive sintering flux concentrator 77 design concentrates the flux within the loop 86 in the copper plate 82. A capacitor 66 is located between opposite sides of the non-conducting slot 84 and adjacent the loop 86. In particular, the very small inductance and parasitic capacitance allows for operation at frequencies well in excess of 1 GHz—over 2000 times higher frequencies than conventional RF induction heating.

The majority of the flux density is located above the loop 86, with very little flux density over the slot 84 outside of the tank circuit 60, thus confirming the concentration of the flux by the placement of the capacitor relative to the loop in the copper plate. Referring to Equation [2], there is nearly 40 times the power transfer over the single turn loop as compared to the slot in the micro-inductive sintering flux concentrator at 185 MHz.

The flux density is sharply peaked near the center of the loop with a full-width half-maximum of approximately 2 mm at 0.5 mm from the surface of the micro-inductive sintering flux concentrator 17. Referring again to Equation [2], the active heating zone will be approximately 1 mm in diameter because the power transfer by induction is proportional to the square of the flux density. This results in a very sharply peaked hot zone in the micro-inductive sintering flux concentrator 17 heating profile.

In the micro-inductive sintering system, a wide bandwidth micro-inductive sintering flux concentrator 77 is a means to couple effectively to all diameter particles in the metallic powder. As an alternative, sufficiently high frequencies can be used such that the vast majority of particles in a given size distribution are heated by either bulk or surface heating. In this regard, a fixed parallel capacitor tank circuit 60 can be designed specific to each powder distribution.

Figure 18B:
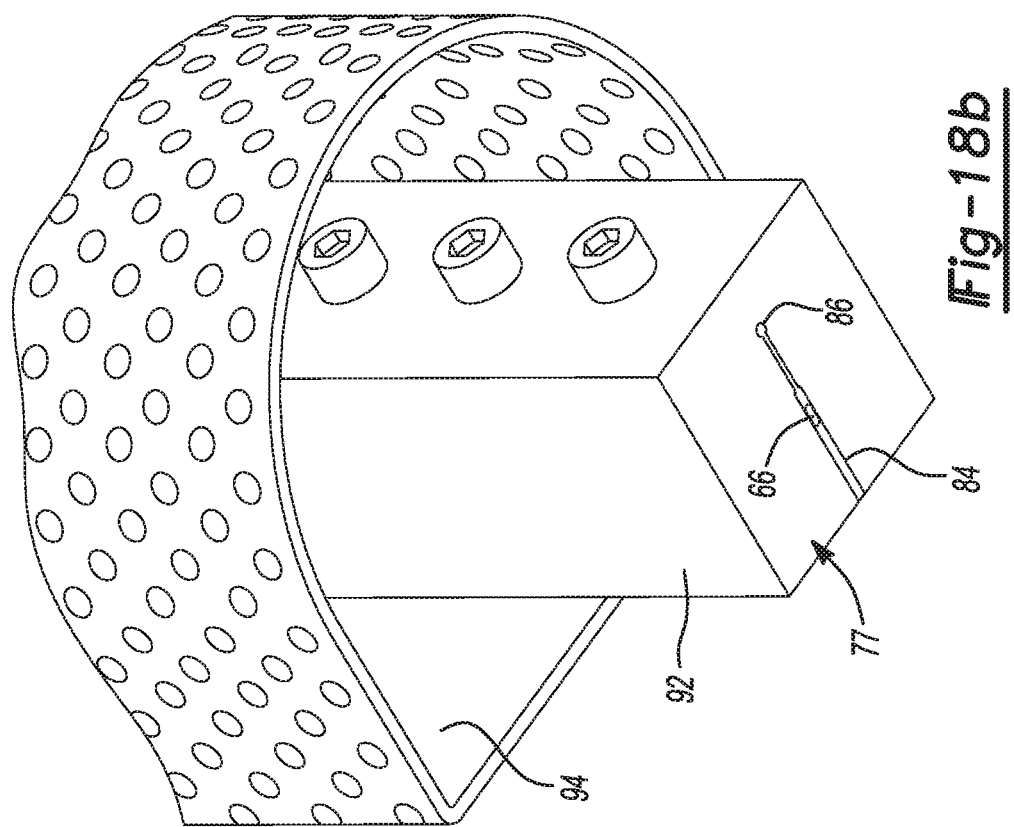
FIGS. 18a and 18b depict the flux concentrator showing FIG. 17 incorporated into a head assembly.
Figure 18A:
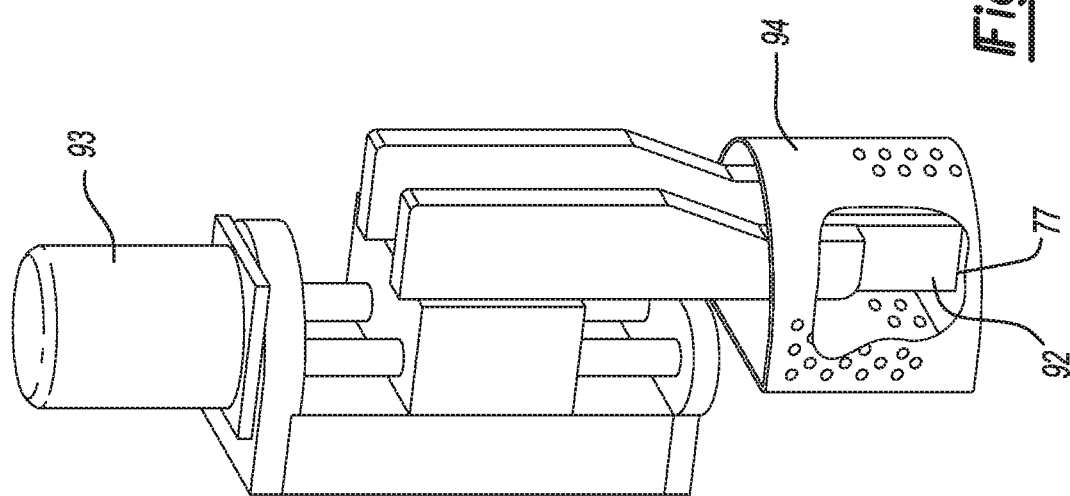

The micro-inductive sintering flux concentrator 77 according to an alternate teaching is shown in FIGS. 18a and 18b. The inductive sintering flux concentrator 77 can be formed into a vertical "print head" assembly, which allows for the precise positioning of the micro-inductive sintering flux concentrator 77 above the powder bed and the easy removal and replacement of the print head, if necessary. In addition, the micro-inductive sintering flux concentrator 77 is thermally connected to a copper heat exchanger 92 that can operate continuously to provide active cooling of the print head assembly. Short duration micro-inductive sintering runs, however, can be performed without active cooling of the micro-inductive sintering flux concentrator 77 because of the sizable mass of the copper heat exchanger sub-system. The micro-inductive sintering flux concentrator 77 print head is equipped with an actuator 93 and a primary onboard RF shield 94, which serves to significantly attenuate the high frequency magnetic field in the region immediately outside the active micro-inductive sintering zone. While this does not replace the RF shielding located in the inert atmosphere box (not shown), it does serve as an additional layer of protection for the end-user.

The solid-state design allows for the efficient removal of heat generated around the flux concentrator 77 and the spatial resolution of the micro-inductive sintering process is determined by the diameter of the single coil 70 inductor machined into the copper plate 82. The inductor 74 and capacitor 66 are in parallel in this configuration and thus form a very high frequency, micro-miniature induction heating tank circuit 60.

The flux concentrator 77 shown in FIGS. 18a and 18b can be used to process materials difficult to form such as ScNc. The ScNc materials consist of superconducting magnesium diboride (MgB2) and gallium (Ga) metal prepared using a milling process that results in an intimate, homogeneous mixture of both materials. FIGS. 19a and 19b show representative Scanning Electron Microscope (SEM) images of the MgB2/Ga ScNc material. This particular ScNc composition is 30% by volume, or approximately 50% by mass, Ga. Though the particle size distribution obtained through laser diffraction suggests ScNc particles as large as 100 μm, SEM image analysis indicates these large particles are agglomerates of 1 to 5 micron diameter particles. The fact that these agglomerates consist of such small individual particles has dramatic consequences on the micro-inductive sintering flux concentrator frequency. Theoretically, a 100 µm diameter ScNc particle, for example, can be bulk heated using a high frequency magnetic field between 50 to 100 MHz. If, however, the "electrical dimension" of the ScNc is much smaller than 100 µm, then the micro-inductive sintering flux concentrator 17 must be designed to operate at much higher frequencies.

In some circumstances, agglomerates of particles (powder) 12 of varying sizes can change their sintering properties. Some determination of a proper frequency regime may be needed based upon an "unknown" electrical dimension for a powder agglomerates. For example, direct feedback measurements using the VSWR system 96 is useful to determine the electrical dimension of non-traditional materials such as ScNc. This method was found to be very effective in determining the minimum frequency required for the ScNc micro-inductive sintering process. It was found experimentally that induction heating of the ScNc did not occur for frequencies less than approximately 700 MHz, which indicates that the "electrical dimension" of the ScNc is on the order of 20 µm. After a series of measurements with increasing resonant frequencies, the ultra-high frequency micro-inductive sintering flux concentrator suitable for ScNc materials shown in FIGS. 19a-19b were used.

As described below, the presented MIS system provides a mechanism for conducting near real time quality confirmation of the formation of a component. The component is fabricated first as a line in the powder bed, which is gradually filled in to a shape. During the fabrication of this component, real time data is collected that gives information as to the quality of the part. These data will serve as a map of the fabrication history of the part during the additive manufacturing MIS process.

These data may take the form of data structure representation of the fabricated part with a superimposed data lattice. Each grid point in the lattice, for example, may contain the forward and reflect power spectrum at the MIS frequency and the forward and reflected power spectrum at lower frequencies (Low-f), which would probe deeper into the part because of the increased skin depth. In addition, this matrix may contain temperature and other data to be used in the rapid qualification process.

Real-time diagnostics coupled with traditional statistical process control and analysis has the potential to form the basis for a powerful rapid qualification method. Inherent MIS capabilities for real-time diagnostics can provide a mechanism for manufacturing yields that could be higher than current manufacturing processes. In conjunction with flexible tool path programming, real-time diagnostics can be used for in-process detection and correction of fabrication errors. This will reduce cycle time and rework requirements and will provide rich data for conforming part validation.

The MIS also provides a significant opportunity for rapid qualification. The method provides multiple degrees of control including powder preparation, magnetic flux signal tuning, and flexibility with MIS-FC positioning for heating control that will permit a high degree of control in sintering kinetics. These degrees of control also provide mechanisms for establishing dependable and stable processes and limiting process variation.

According to the present teaching, there are many opportunities for established process monitoring points, from the monitoring of forward and reflected power in the real time diagnostics approach described above, to the materials properties of the powders. These deliver well-quantified, real-time performance information with a high degree of precision. The method lends itself well to a statistical process control approach and development of conforming products.

FIG. 20 shows the forward and reflected power spectrum of the ScNc micro-inductive sintering flux concentrator with a resonant frequency of approximately 1.2 GHz. As seen, there are many resonances in the micro-inductive sintering flux concentrator circuit over this wide bandwidth. The resonance at 1229 MHz, however, corresponds to the resonance in the tank circuit 60 associated with the installed tank capacitor.

FIG. 21 shows the calculated VSWR power spectrum of the micro-inductive sintering flux concentrator 77 with a resonant frequency of approximately 84.5 MHz. As seen, there is a single resonance in the micro-inductive sintering flux concentrator circuit over the displayed bandwidth. The resonance at 84.5 MHz corresponds to the resonance in the tank circuit 60 associated with installed capacitor 66. The measured VSWR of the micro-inductive sintering flux concentrator 77, which displays a minimum at 84.5 MHz corresponds to approximately 80% transfer of power to the powder 12.

FIG. 22a shows a sample slide of γ TiAl material processed on top of an inverted 84.5 MHz micro-inductive sintering flux concentrator 77. The total power delivered to the micro-inductive sintering flux concentrator 77 was approximately 35 W RF for this test during testing. A bright light was produced directly over the inductive component of the micro-inductive sintering flux concentrator 77, providing evidence of highly localized induction heating.

FIGS. 22b and 22c show the SEM images of the ScNc power after exposure to the 84.5 Ghz micro-inductive sintering process. The heat in these preliminary tests may have resulted in the partial decomposition of the material with subsequent evaporation and condensation of the ScNc. Because the micro-inductive sintering technique is not pressure assisted, a key barrier to high levels of consolidation is the failure to effectively wet the surfaces of the ScNc. A ScNc powder with a flash coating of initiating metal can be used to encourage the wetting of ScNc. A flash coating of Al on MgB2 will improve the sintering characteristics of MgB2/Ga ScNc materials FIGS. 23a-23c schematically show the building of a component according to the teachings herein. After the portion 40 of a first layer 42 of the powder mixture 12 has been solidified, a second layer 46 of mixture is disposed over the first layer 42. Second portions 48a and 48b of the mixture are then melted and solidified using the concentrated magnetic field. It should be noted that the processing parameters can change during the formation of the component. These parameters can include, but are not limited to environmental temperature, magnetic field frequencies and the application time of the magnetic fields. The layers of mixtures are recursively added and sintered to form the component. The additive manufacturing system 10 can apply a magnetic field, having a frequency greater than 10 MHz, or preferably between about 10 MHz and about 2.0 GHz, to the first layer of the powder mixture 12 to melt at least a skin layer of a portion of the first material. The frequency depends on the electrical properties and morphology of the powder.

The sintering and consolidation of ceramic/metal matrix and metallic powders (MgB2/Ga ScNc materials) using the micro-inductive sintering process depicts the use of the additive manufacturing process for a wide variety of materials which have historically proven to be technically difficult to consolidate.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of induction heating powder:
providing a first layer of the powder, the powder being formed of a material having a resistivity;
determining a first frequency of an alternating magnetic field to induce an eddy current sufficient to heat only a first portion at a surface of the powder with the alternating magnetic field;
applying a first alternating magnetic field at the first frequency to the powder at a power level sufficient to heat the first portion at the surface of the powder with the alternating magnetic field;
measuring a reflected power of the applied first alternating magnetic field;
calculating a change in the reflected power of the applied first alternating magnetic field over time; and
comparing the calculated change in reflected power to a predetermined value to determine a process characteristic, the process characteristic being coupling of the alternating magnetic field to the powder.

2. The method according to claim 1, further comprising producing a signal indicative of a complete sintering based on the calculated change in reflected power.

3. The method according to claim 2, further comprising determining a second frequency of an alternating magnetic field sufficient to heat only a second portion at the surface of the powder with the alternating magnetic field, and apply a second alternating magnetic field at the second frequency to the second portion at the surface of the power with the second alternating magnetic field.

4. The method according to claim 1, wherein calculating a change in reflected power includes calculating a first reflected signal power in a presence of magnetically coupled powder and calculating a second reflected signal power in an absence of magnetically coupled powder.

5. The method according to claim 1, wherein applying a first alternating magnetic field to a portion of the powder is applying a signal having a frequency between 10 MHz and 2.0 GHz to a flux concentrator.

6. The method according to claim 5, wherein applying a signal is applying a signal through a tank circuit.

* * * * *